(12) United States Patent
Lammering et al.

(10) Patent No.: US 12,168,904 B2
(45) Date of Patent: Dec. 17, 2024

(54) GATE SAFETY SYSTEM FOR PREVENTING COLLISIONS BETWEEN A VEHICLE AND A GATE

(71) Applicant: Comnovo GmbH, Dortmund (DE)

(72) Inventors: David Lammering, Dortmund (DE); Andreas Lewandowski, Dortmund (DE); Ron Winkler, Dortmund (DE)

(73) Assignee: Comnovo GmbH, Dortmund (DE)

( * ) Notice: Subject to any disclaimer, the term of this patent is extended or adjusted under 35 U.S.C. 154(b) by 568 days.

(21) Appl. No.: 17/273,026

(22) PCT Filed: Sep. 2, 2019

(86) PCT No.: PCT/EP2019/073346
§ 371 (c)(1),
(2) Date: Mar. 3, 2021

(87) PCT Pub. No.: WO2020/048919
PCT Pub. Date: Mar. 12, 2020

(65) Prior Publication Data
US 2021/0340805 A1    Nov. 4, 2021

(30) Foreign Application Priority Data
Sep. 4, 2018   (DE) .......................... 202018105041.9

(51) Int. Cl.
*E05F 15/73*      (2015.01)
*B60T 7/18*       (2006.01)
(Continued)

(52) U.S. Cl.
CPC ................ *E05F 15/73* (2015.01); *B60T 7/18* (2013.01); *B66F 17/003* (2013.01); *G08G 1/165* (2013.01);
(Continued)

(58) Field of Classification Search
CPC ........ E05F 15/73; B60T 7/18; B60T 2210/32; B66F 17/003; G08G 1/165; E05Y 2400/45; E05Y 2400/53; E05Y 2900/40
See application file for complete search history.

(56) References Cited

U.S. PATENT DOCUMENTS 4,849,735 A * 7/1989 Kirtley ................. B66F 17/003
                                                          340/901
7,859,390 B2   12/2010 Zuziak et al.
(Continued)

FOREIGN PATENT DOCUMENTS

DE   202005003366 U1 *  7/2005   .............. B66F 17/00
DE   102006014450 A1    10/2007
(Continued)

OTHER PUBLICATIONS

Machine Translation of Hans's reference (DE-202005003366-U1) (Year: 2005).*
(Continued)

*Primary Examiner* — Tarek Elarabi
(74) *Attorney, Agent, or Firm* — Wood Herron & Evans LLP

(57) ABSTRACT

A gate safety system for preventing collisions between a vehicle and a gate is provided, the system having a gate module with a vehicle module, a gate antenna unit and a gate processing unit. The gate processing unit is adapted for defining a first gate warning zone and for determining whether a vehicle module is present within the first gate warning zone. The vehicle module includes a vehicle antenna unit and a vehicle processing unit adapted for defining at least one first vehicle warning zone for determining whether the gate module is present within the vehicle warning zone. A lock safety system, two methods for
(Continued)

operating the gate safety system and the lock safety system, and two computer programs are also provided.

20 Claims, 14 Drawing Sheets

(51) Int. Cl.
*B66F 9/06* (2006.01)
*B66F 17/00* (2006.01)
*G08G 1/16* (2006.01)

(52) U.S. Cl.
CPC ........... *B60T 2210/32* (2013.01); *B66F 9/063* (2013.01); *E05Y 2400/45* (2013.01); *E05Y 2400/53* (2013.01); *E05Y 2900/40* (2013.01)

(56) References Cited

U.S. PATENT DOCUMENTS

| | | | | |
|---|---|---|---|---|
| 8,922,431 | B2* | 12/2014 | Bruno | B60W 50/14 342/464 |
| 8,955,253 | B2* | 2/2015 | Kanki | E05F 15/74 49/25 |
| 10,427,597 | B2* | 10/2019 | Hänninen | B66F 9/0755 |
| 2004/0075046 | A1 | 4/2004 | Beggs et al. | |
| 2011/0249118 | A1* | 10/2011 | Bruno | B60W 30/0953 348/148 |
| 2013/0255154 | A1* | 10/2013 | Kanki | B66B 13/26 49/25 |
| 2017/0057798 | A1* | 3/2017 | Dues | B60T 8/17 |
| 2018/0170250 | A1* | 6/2018 | Hänninen | G08G 1/163 |

FOREIGN PATENT DOCUMENTS

| | | |
|---|---|---|
| DE | 102008036412 A1 | 2/2010 |
| DE | 102015102379 A1 | 8/2016 |
| DE | 102016113312 A1 | 1/2018 |
| DE | 102017102116 A1 | 8/2018 |
| EP | 1767488 A2 | 3/2007 |
| WO | 9640533 A1 | 12/1996 |
| WO | 2011151291 A1 | 12/2011 |
| WO | 2016203103 A1 | 12/2016 |
| WO | 2018015315 A1 | 1/2018 |

OTHER PUBLICATIONS

International Searching Authoriy, Search Report and Written Opinion issued in PCT/EP2019/073346 mailed Nov. 18, 2019 (15 pages).
German Patent Office, Search Report issued in DE 20 2018 105 041.9 dated Mar. 11, 2019 (5 pages).

* cited by examiner

GATE SAFETY SYSTEM FOR PREVENTING COLLISIONS BETWEEN A VEHICLE AND A GATE

CROSS-REFERENCE TO RELATED APPLICATIONS

This application is a national phase entry of, and claims priority to, International Application No. PCT/EP2019/073346, filed Sep. 2, 2019, which claims priority to DE 20 2018 105 041.9, filed Sep. 4, 2018. The above-mentioned patent applications are incorporated herein by reference in their entireties.

TECHNICAL FIELD

This application relates to a gate safety system for preventing collisions between a vehicle and a gate, a method, and a computer program.

BACKGROUND

Gate safety systems are known in various designs in the prior art and are used particularly for preventing a collision between a truck and a roll-up gate in a warehouse or production hall. Several examples are now discussed.

U.S. Pat. No. 4,849,735 describes, for example, a radio-controlled safety system for forklift trucks, where, with the aid of said safety system, the intention is to prevent the forklift truck from driving into a closed gate. To this end, radio signals are transmitted from a transmitter mounted above the gate and are received by the vehicle. An alarm signal is generated after a particular first distance to the gate is reached and the forklift truck is stopped when a second, shorter distance is reached.

International PCT Patent Publication No. WO 96/40533 discloses a device for stopping a forklift truck too closely or too quickly approaching a power-operated gate that is not yet fully open. A presence sensor is thereby provided for containing a radar device or another typical sensor, which can detect the presence or distance and the speed of a forklift truck and is disposed above the gate. A control unit reacting to signals from the presence sensor and to signals from limit switches on the gate controls the operation of the gate and of a transmitter. If a forklift truck is detected in a first zone further away from the gate, the control unit may set an increased opening speed of the gate depending on the degree that the gate is already opened. If the forklift truck is present in a second zone closer to the opening gate, a signal is sent from the transmission unit to the forklift truck depending on the degree of opening, and the forklift truck is stopped, either by interrupting the fuel supply or by actuating the brakes.

This system is therefore dependent on detecting the truck. This requires systems that can identify the truck from the radar signals. A line of sight from the radar sensor to the truck is also required. In contrast, problems can arise if the truck is screened.

German Utility Model No. DE 20 2005 003 366 U1 is comparable in terms of content to U.S. Pat. No. 4,849,735, in that the vehicle speed is forced to be reduced in a first spatial region, possibly down to creeping speed.

European Patent Application No. EP 1 767 488 discloses a driver assistance system by which a reduction in damage to building equipment, for example, roll-up gates, is to be achieved. The driver assistance system works using a transponder mounted above the gate, said transponder sending UHF signals to the forklift truck when the gate is approached. Here, data is transmitted, for example, relating to the maximum lifting height, maximum speed, stop function, etc. The data received are compared with current data in the forklift truck and a display is generated when the data is exceeded, for example, with respect to the maximum speed and/or the maximum lifting height in the gate region.

The purpose of the assistance system is to provide the driver with additional information without depriving him of full responsibility and control of the industrial truck. However, it is also conceivable, for example, to actively engage in the speed regulation of the vehicle or in other functions.

U.S. Pat. No. 7,859,390 describes a system in which the distances between a gate that opens automatically when a forklift truck approaches and the forklift truck are determined by transit time measurements of acoustic signals and, if necessary, warnings are generated and the forklift trucks are optionally braked. To this end, an interrogation unit is disposed above the gate, which interrogation unit communicates with a transponder on the respective forklift truck by a wave transmitter and receiver and initiates an acoustic signal from the transponder when the forklift truck approaches in order to be able to determine the distance by a transit time measurement. The forklift truck can then be braked depending on the determined distance in order to avoid collisions.

This international PCT patent publication no. WO 2016/203103 discloses a safety system having a vehicle identifier for, for example, a forklift truck and a personal identifier, each of which is capable of mutual radio communication and of issuing alarm signals that are initiated depending on the distances determined. In one design, when the forklift truck approaches a gate provided with a sensor, the gate is automatically opened from a particular distance.

Furthermore, known systems are primarily designed for avoiding collisions between humans and trucks. One such system is fundamentally known from International PCT Patent Publication No. WO 2011/151291. Disclosed there is a proximity warning system for detecting the proximity of displaceable objects, particularly of persons, to a vehicle having such a proximity warning system.

Furthermore, a system is known from the present applicant from International PCT Patent Publication No. WO 2018/015315 for warning persons in traffic, having an antenna unit having at least a first antenna, a second antenna and a third antenna, implemented for mounting spaced apart from each other and in a predetermined spatial relationship to each other at predetermined positions on a vehicle to be safeguarded and each generating an electromagnetic field, and a control unit connected to the antenna unit, said control unit being implemented for defining a warning zone for the vehicle, and for determining by the antenna unit whether a warning module matched to the antenna unit is present within the warning zone. A corresponding warning module is matched to the antenna unit of the vehicle safety device and is worn by a person. The warning module comprises a control unit and an antenna cooperating with the antenna unit of the vehicle safety device, wherein the warning module is implemented for receiving a signal and for outputting a warning signal when it is determined that the warning module is present within the warning zone.

One problem with the known systems is either that, like the system known from WO 2018/015315, said systems are not suitable for use with roll-up gates, or, as with the other known systems, that insufficient communication takes place between the vehicle and the gate, or between corresponding devices or transponders disposed on the vehicle or the gate.

For example, some systems are dependent on automatically identifying the truck and taking action based thereon. Other systems detect a truck's transponder and, in response thereto, open the roll-up gate, for example. In this case, however, it cannot be detected whether the truck will actually drive through the gate or is present only present in the vicinity of the gate. Other systems brake the truck, regardless of where it is, as long as it is present in the vicinity of the gate. Some systems comprise steering angle sensors or the like, but only use said sensors locally.

A particular problem arises in the case of incorrect braking or incorrect opening, that is, incorrect braking of the truck, although there is no intention to drive through the gate or in the direction of the gate, or incorrect openings, that is, openings of roll-up gates, although a truck is not approaching it. Employees are irritated by such incorrect braking or incorrect opening and the acceptance of a system drops significantly. It is thus desirable to increase the acceptance of such systems.

It would therefore be desirable to provide a system improved in comparison with the prior art and, particularly, offering greater safety and acceptance, largely avoiding false warnings, incorrect braking or incorrect opening of gates, and able to be easily retrofitted.

SUMMARY

To address these and other problems with the conventional designs, a gate safety system is provided and includes a gate module comprising a gate antenna unit having at least one first gate antenna, the gate antenna unit being implemented for mounting in a predetermined spatial relationship to a gate frame of the gate and for generating a first three-dimensional electromagnetic field, preferably having a wavelength of 780 nm, preferably 60 mm or more, preferably in a range from about 70 mm to about 80 mm, and/or a frequency in a range from 3 GHz to 5 GHz, preferably 3.5 GHz to 4.5 GHz, particularly preferably 3.75 GHz to 4.25 GHz. The gate module further comprises a gate processing unit connected to the gate antenna unit, the gate processing unit being adapted for defining at least one first gate warning zone for the gate, said first gate warning zone representing a sub-region of the first electromagnetic field, wherein the gate processing unit is adapted for determining, by the gate antenna unit, whether a vehicle module matched to the gate antenna unit is present within the first gate warning zone. Finally, the gate module comprises a gate interface for connecting the gate module to a controller of the gate.

The gate safety system further comprises a vehicle module, in turn comprising a vehicle antenna unit having at least one first vehicle antenna implemented for mounting in a predetermined spatial relationship on the vehicle, and for generating a second three-dimensional electromagnetic field, preferably having a wavelength of 780 nm, preferably 60 mm or more, preferably in a range from about 70 mm to about 80 mm, and/or a frequency in a range from 3 GHz to 5 GHz, preferably 3.5 GHz to 4.5 GHz, particularly preferably 3.75 GHz to 4.25 GHz. Further, the vehicle module comprises a vehicle processing unit connected to the vehicle antenna unit and adapted for defining at least one first vehicle warning zone for the vehicle, said first vehicle warning zone representing a sub-region of the second electromagnetic field, wherein the vehicle processing unit is adapted for determining, by the vehicle antenna unit, whether the gate module matched to the vehicle antenna is present within the first vehicle warning zone.

The system substantially consists of two modules, namely a gate module and a vehicle module. The gate module is associated with the gate and the vehicle module is associated with the vehicle. The gate is preferably a roll-up gate, wherein other gates are also to be encompassed. The gate module comprises at least one gate antenna unit and one gate processing unit. At least the gate antenna unit is disposed adjacent to the gate, preferably in the vicinity of one of the upper corners, or in the center of the crossbeam, of the gate frame. In contrast, the gate processing unit can also be disposed remotely from the gate but is preferably also disposed in the vicinity of the gate. It is particularly preferable for the gate antenna unit and gate processing unit to be housed in a common housing, whereby assembling and retrofitting are easier.

The gate module can be connected to the controller of the gate by a gate interface and can provide signals to the controller and read out signals from the controller of the gate. The gate module generates a first three-dimensional electromagnetic field. The electromagnetic field has a frequency in a range of preferably 3.75 GHz to 4.25 GHz, whereby particularly good coverage can also be achieved in screened regions.

The vehicle module, in contrast, is mounted on the vehicle, particularly a truck. The vehicle module also generates a three-dimensional electromagnetic field, preferably having a wavelength of 780 nm, preferably 60 mm or more, preferably in a range from about 70 mm to about 80 mm, and/or a frequency in a range from 3 GHz to 5 GHz, preferably 3.5 GHz to 4.5 GHz, particularly preferably 3.75 GHz to 4.25 GHz. The first gate warning zone is preferably present in the vicinity of the gate and, in a vertical projection, covers the region in front of or behind or in front of and behind the gate, for example. When geometries or configurations or shapes of warning zones are mentioned below, a vertical projection onto the floor is meant in each case. For example, the first gate warning zone has a substantially rectangular shape and extends in the width direction slightly to the side of the struts of the gate frame and then away from the gate, in the manner of a five-meter football space, in order to cover the gate.

The vehicle warning zone can also be formed in a corresponding manner. Fundamentally, the vehicle warning zone can be formed as in WO 2018/015315, and the disclosure there is included in a fully referencing manner. The vehicle warning zone is displaced together with the vehicle.

Both the gate module and the vehicle module are set up for detecting each other. The gate module detects when a vehicle module is present within the first gate warning zone. Conversely, the vehicle module can determine that a gate module, more precisely a gate antenna unit, is present within the first vehicle warning zone. Based on the determination that a gate module is present within the first vehicle warning zone and/or a vehicle module is present within the first gate warning zone, various follow-on operations can then be derived and performed in order to prevent a collision.

For example, it can be provided that the vehicle module and/or the gate module are implemented for outputting a warning signal when the other module is detected. The two modules can also alternately send a signal to each other in order to cause the other module to output a warning signal. For example, it is conceivable and preferred that when the gate module detects that a vehicle module is in the first gate warning zone, the gate module sends a signal to the vehicle module and, in response, said module outputs a warning signal for the driver. Conversely, it can also be provided that, when the vehicle module determines that a gate module is within the first vehicle warning zone, the vehicle module sends a signal to the gate module and the gate module activates a corresponding warning signal, for example, illuminating a lamp.

In a preferred embodiment, the first gate warning zone is associated with a first gate activity set having at least one first gate follow-on operation and a second gate activity set having at least one second gate follow-on operation. A first vehicle activity set having at least one first vehicle follow-on operation and a second vehicle activity set having at least one second vehicle follow-on operation are associated with the first vehicle warning zone in the same way. The first and second activity sets are preferably activated as a function of whether a vehicle module was detected within the first gate warning zone and/or a gate module was detected within the first vehicle warning zone. It is also conceivable that the first and second activity sets are activated as a function of further factors, such as a speed, a location of the respective module within the respective warning zone, and the like. A follow-on operation can particularly comprise the sending of a signal, wherein such a signal can be a warning signal, an opening signal, a brake signal, or the like. A further follow-on operation can also comprise activating a further warning zone, changing the warning zone, acting on further elements, and the like. According to a further preferred embodiment, the gate processing unit is adapted for receiving a state signal by the gate interface and, by the received state signal, for determining whether the gate is in an open or closed state. The gate processing unit is preferably also set up for determining whether the gate is currently in motion and/or how far said gate is open.

The gate processing unit is preferably implemented for selecting the first or second gate activity set as a function of the determined state. For example, it can be provided that the gate processing unit selects the first gate activity set when it is determined that the gate is closed and selects the second gate activity set when it is determined that the gate is open. In this case, the first gate activity set can then comprise a follow-on operation, for example, initiating braking of the vehicle, and the second gate activity set preferably comprises a follow-on operation for initiating only a warning, not braking. The first gate activity set can furthermore comprise a follow-on operation leading to the gate being opened or leading to an accelerated opening of the gate. It is also conceivably preferred that the current degree of opening of the gate is transferred to the vehicle module.

The gate processing unit is particularly preferably set up for sending a brake signal for braking the vehicle to the vehicle module. If the gate module determines that a vehicle module is within the first gate warning zone, the gate processing unit preferably sends such a brake signal to the vehicle module, which in turn outputs the brake signal, or a derived brake signal, to a vehicle controller so that the vehicle is braked. Such a brake signal is preferably provided by the gate processing unit as long as the gate is closed and/or is only partially open. It can also be provided that graduated brake signals suitable for braking to a predetermined speed are provided. For example, it can be provided that the vehicle is braked to a stop as long as the gate is closed but is only braked to walking speed when the gate is partially or fully open.

In a further preferred embodiment, the gate processing unit is set up for providing an opening signal for opening the gate at the gate interface. In one variant, this can be done automatically when the gate processing unit determines that a vehicle module is present in the first warning zone. In a further variant, it can also be provided that a vehicle module is set up to send an opening signal to the gate module when the vehicle module determines that a gate module is within the first vehicle warning zone. The opening signal sent by the vehicle module is then forwarded by the gate processing unit, or a derived signal is provided at the gate interface so that the gate is opened. In a preferred development, it is provided that the gate processing unit is set up to send a configuration of the first gate warning zone to the vehicle module. The vehicle module is preferably provided to process the configuration of the first gate warning zone, for example, in order to determine whether it is present within the first gate warning zone. It is also conceivable that the vehicle module is set up for determining the direction in which the vehicle is approaching or moving away from the gate, and based on said determination, to preferably send a corresponding signal to the gate module.

The gate processing unit is preferably adapted for defining a second gate warning zone for the gate, which second gate warning zone represents a sub-region of the first electromagnetic field, wherein the gate processing unit is adapted, by the gate antenna unit, for determining whether the vehicle module is present within the second gate warning zone. The second gate warning zone can be disposed next to the first gate warning zone, on an opposite side of the gate, or partially or completely overlapping with the first gate warning zone. The second gate warning zone is preferably closer to the gate or smaller than the first gate warning zone, so that a determination of the vehicle module in the second gate warning zone generally indicates that the vehicle is present closer to the gate than when it only would have been determined in the first gate warning zone.

It can also be provided that the first or second activity set is activated depending on whether the vehicle module is present in the first or second gate warning zone. For example, it can be provided that the first gate activity set is activated when the vehicle module enters the first gate warning zone, and the second gate activity set is activated when the vehicle module enters the second gate warning zone. The first gate activity set can then contain, for example, a follow-on operation that brings about a warning signal to be output to the vehicle module. In a corresponding manner, the second gate activity set can comprise a follow-on operation which causes the vehicle to be braked.

The same can apply analogously to the vehicle. The vehicle processing unit can also be adapted for defining a second vehicle warning zone for the vehicle.

In a variant, the first gate warning zone is circular, oval, rectangular or trapezoidal in a vertical projection. It can also be provided that the configuration of the first gate warning zone varies as a function of the opening height of the gate. For example, it can be provided that a closed gate comprises a larger gate warning zone than an open gate.

The gate module preferably comprises two or more antennas, each of which is connected to its own control unit, preferably a gate processing unit, and which together span the first electromagnetic field. The two units comprising antenna and control unit preferably monitor each other for functionality. Each unit can also comprise more than one antenna. As soon as one of the control units determines that the other antenna and/or control unit is no longer functioning or is no longer functioning properly, the functioning unit takes over the entire first gate warning zone and can change the configuration of the first gate warning zone for this purpose. It can also be provided that the functioning unit constructs a completely new first gate warning zone and possibly also a second gate warning zone.

The first vehicle warning zone is preferably implemented by the vehicle module or the vehicle processing unit in such a way that it extends forward from the vehicle in the direction of travel. For example, the first vehicle warning zone can be approximately trapezoidal and extend forward from a front of the vehicle and thereby widen slightly. It can also be provided that the geometry and/or alignment of the first vehicle warning zone is varied as a function of a steering angle. The first vehicle warning zone is preferably continually oriented in such a way that it covers, for example, a future trajectory for the vehicle, for example, for the next 2, 4, 6, 8 or 10 seconds. This then also means that the size of the first vehicle warning zone is varied as a function of the speed. A higher vehicle speed then results in a larger vehicle warning zone, while a low speed results in a smaller vehicle warning zone. The vehicle processing unit can be implemented to send a configuration of the first vehicle warning zone to the gate module, wherein the gate module is further set up for determining a direction of travel of the vehicle relative to the gate based on the received configuration of the first vehicle warning zone.

In this way, it is possible for the gate module to be set up for providing an opening signal for opening the gate when it is determined that the vehicle module is moving towards the gate. Depending on the direction of travel of the vehicle, it can occur that the vehicle drives through the first gate warning zone parallel to the gate, that is, not approaching the gate, but only parallel to said gate, so that opening the gate is not necessary. According to this embodiment, this is determined by the gate module and accordingly no opening signal is provided at the gate interface. This prevents the gate from opening incorrectly and an operator of the vehicle is not distracted or warned unnecessarily.

In a second consideration of the invention, the object mentioned above is achieved by a method for preventing collisions between a vehicle and a gate using a gate safety system according to one of the preferred embodiments described above of a gate safety system according to the first consideration of the invention, wherein the vehicle module is mounted on a vehicle, particularly a truck, and the gate module is mounted adjacent to a gate, particularly a roll-up gate of a hall, wherein the method comprises the steps: generating a first three-dimensional electromagnetic field having a frequency in a range of about 3.75 GHz to 4.25 GHz using the gate antenna unit; defining a first gate warning zone for the gate, which first gate warning zone represents a sub-region of the first electromagnetic field; generating a second three-dimensional electromagnetic field having a frequency in a range of 3.75 GHz to 4.25 GHz using the vehicle antenna unit; defining a first vehicle warning zone for the vehicle, which first vehicle warning zone represents a sub-region of the second electromagnetic field; determining whether the vehicle module is present within the first gate warning zone using the gate processing unit; and determining whether the gate module is present within the first vehicle warning zone using the vehicle processing unit.

It should be understood that the gate safety system according to the first consideration of the invention and the method according to the second consideration of the invention have identical and similar sub-considerations, as are particularly set forth below. In this respect, reference is made in full to the above description of the gate safety system according to the first consideration of the invention.

The method represents a sequence in which mutual communication between the vehicle module and the gate module takes place. Both modules are active and mutually detect the penetration of the other module into the warning zone thereof. This can significantly increase safety and prevent false alarms or incorrect follow-on operations from being initiated.

The method preferably comprises the steps: determining whether a further vehicle module matched to the gate antenna unit, which further vehicle module is mounted on a further vehicle, is present within the first gate warning zone using the gate processing unit; and sending brake signals from the gate processing unit to the vehicle module and the further vehicle module. The method preferably also comprises the steps: providing a derived brake signal for the vehicle at a vehicle interface of the vehicle module for braking the vehicle and providing a derived brake signal for the further vehicle at a vehicle interface of the further vehicle module for braking the further vehicle. Both vehicles are thus braked if it is determined that two vehicle modules are present within the first gate warning zone. The braking can be designed to stop, or only to reduce the speed of the two vehicles by a degree, in order to avoid collisions. It can also be provided that one of the two vehicles is braked completely while the other is only slowed down.

The method preferably further comprises the following step: determining whether the vehicle module is moving towards the gate. This is preferably done by sending a configuration of the first vehicle warning zone to the gate processing unit and determining, using a configuration of the first gate warning zone, a direction of travel of the vehicle relative to the gate. If a second gate warning zone is provided for the gate, the configuration of the second gate warning zone can also be used. The same applies to the first vehicle warning zone. By comparing the two zones, the first gate warning zone and the first vehicle warning zone, it can be determined in which direction the vehicle is moving, and from this it can be determined whether the vehicle will drive through the gate, that is, whether a pre-calculated vehicle trajectory runs through the gate. If this is determined, an opening signal is preferably sent from the vehicle module to the gate module and received at the gate module and a comparison of the opening signal from the gate module is provided at a gate interface of the gate module. The gate interface of the gate module is preferably connected or can be connected to a controller of the gate, so that the gate is opened or is kept open in response thereto.

The gate is not only opened on the gate side, but a signal that is sent from the vehicle to the gate module is required.

The method preferably further comprises the steps: sending a brake signal from the gate module to the vehicle module in the event that it is determined that the vehicle is moving towards the gate; and receiving the brake signal at the vehicle module and providing a derived brake signal at a vehicle interface of the vehicle module. In this embodiment, braking preferably does not take place until the vehicle comes to a stop, but rather the vehicle is braked, for example, at walking speed, until it has driven through the gate. If, for example, it is detected that the vehicle is moving away from the gate, the brake signal can be omitted, or a further signal is sent, for example, an acceleration signal which indicates that the vehicle is allowed to accelerate. In this way, it is possible to automatically brake the vehicle when passing through a gate and to accelerate said vehicle again after passing through.

It is further preferable that the method comprises the step: determining a mast height of the vehicle; and outputting a warning signal to the vehicle module when the determined mast height is greater than the gate opening height. The mast height of the vehicle is preferably determined by a sensor on the vehicle, for example, a contact sensor, scanner or the like. The mast height can then be sent from the vehicle module to the gate module and, based thereon and on signals received by the gate module from the controller of the gate, the gate module determines whether the mast height is greater than the current opening of the gate. In the event that the mast height is greater than the gate opening, at least one warning signal is output to the vehicle module. It can also be provided that further signals are provided, such as a brake signal and/or a signal for lowering the mast.

In a third consideration, the first-mentioned object is achieved by a computer program, comprising commands, that brings about the gate safety system according to one of the preferred embodiments of a gate safety system described above according to the first consideration of the invention to perform the method steps of the method according to one of the preferred embodiments of a method described above according to the second consideration of the invention.

In a fourth consideration, the object mentioned above is achieved by a lock safety system for preventing collisions between vehicles, having a first gate module, comprising a first gate antenna unit, having at least one first gate antenna, which is adapted to be mounted in a predetermined spatial relationship to a gate frame of a first gate, and to generate a first three-dimensional electromagnetic field, a first gate processing unit connected to the first gate antenna unit and adapted for defining at least one first gate warning zone for the first gate, which first gate warning zone represents a sub-region of the first electromagnetic field, wherein the first gate processing unit is adapted, by the first gate antenna unit, for determining whether a vehicle module matched to the first gate antenna unit is present within the first gate warning zone, and a first gate interface for connecting the first gate module to a controller of the first gate. Furthermore, the gate safety system comprises a second gate module, comprising a second gate antenna unit, having at least one second gate antenna, which is adapted to be mounted in a predetermined spatial relationship to a gate frame of a second gate, which second gate module forms a lock with the first gate, and to generate a second three-dimensional electromagnetic field, a second gate processing unit connected to the gate antenna unit, which second gate processing unit is adapted for defining at least one third gate warning zone for the second gate, which third gate warning zone represents a sub-region of the second electromagnetic field, wherein the second gate processing unit is adapted, by the second gate antenna unit, for determining whether a vehicle module matched to the second gate antenna unit is present within the third gate warning zone, and a second gate interface for connecting the second gate module to a controller of the second gate; and having at least one vehicle module, comprising a vehicle antenna unit, having at least one first vehicle antenna, which is adapted to be mounted in a predetermined spatial relationship on the vehicle, and to generate a first three-dimensional electromagnetic vehicle field, wherein the first gate module is adapted to send a configuration of the first gate warning zone to the second gate module when it is determined that the vehicle module is present within the first gate warning zone, and wherein the second gate module is adapted to send a configuration of the third gate warning zone to the first gate module when it is determined that the vehicle module is present within the third gate warning zone.

The first gate is disposed at a first entrance to a space and forms a lock with the second gate, which is disposed at a second entrance to the space. The lock is preferably closed by the first gate and the second gate. The space is preferably formed by side walls which connect the first gate and the second gate. The lock can comprise further entrances, which are preferably closed by further gates.

The lock safety system thus comprises three modules, namely a first gate module, a second gate module and a vehicle module. The first gate module is associated with the first gate, the second gate module is associated with the second gate and the vehicle module is associated with a vehicle. The first gate and/or the second gate is preferably a roll-up gate, wherein other gates are also to be encompassed. The first gate module and the second gate module are set up to detect the vehicle module. The first gate module thus detects when a vehicle module is present within the first gate warning zone, and the second gate module detects when a vehicle module is present within the third gate warning zone. In response to determining that a vehicle module is present within the first gate warning zone, the first gate module sends the configuration of the first gate warning zone to the second gate module. Likewise, in response to a determination that a vehicle module is present within the third gate warning zone, the second gate module sends the configuration of the third gate warning zone to the first gate module.

Various follow-on operations can be derived in order to prevent a collision based on a determined vehicle module within the first gate warning zone and/or within the third gate warning zone. For example, it can be provided that the first gate module and/or the second gate module is adapted to output a warning signal based on a determined vehicle module within the first gate warning zone and/or third gate warning zone. The two modules can also alternately send a signal to each other in order to cause the other module to output a warning signal.

The vehicle module is preferably set up to detect the first gate module and the second gate module. It can also be provided that the first gate module is set up to detect the second gate module and/or that the second gate module is set up to detect the first gate module. The first gate module is preferably adapted for determining a distance to the second gate module. The second gate module can also be adapted for determining a distance to the first gate module. In a particularly preferred embodiment, the first gate processing unit is adapted for defining the first gate warning zone using the determined distance to the second gate module. Furthermore, the second gate processing unit is preferably adapted for defining the second gate warning zone using the determined distance to the first gate module.

In a preferred embodiment, the first gate processing unit is adapted for defining a second gate warning zone representing a sub-region of the first electromagnetic field, wherein the first gate processing unit is adapted for determining, by the first gate antenna unit, whether the vehicle module is present within the second gate warning zone. In addition, the second gate processing unit is adapted for defining a fourth gate warning zone representing a sub-region of the second electromagnetic field, wherein the second gate processing unit is adapted, by the second gate antenna unit, for determining whether the vehicle module is present is present within the fourth gate warning zone. The first gate processing unit is preferably adapted for determining, based on the configuration of the first and/or the second gate warning zone, whether the vehicle module is present within the lock. In an analogous manner, the second gate processing unit can be adapted, based on the configuration of the third and/or the fourth gate warning zone, for determining whether the vehicle module is present within the lock.

The first gate module is preferably adapted to send a configuration of the second gate warning zone to the second gate module when it is determined that the vehicle module is present within the second gate warning zone, and the second gate module is preferably adapted to send a configuration of the fourth gate warning zone to the first gate module when it is determined that the vehicle module is present within the fourth gate warning zone.

In a preferred embodiment, the second gate warning zone is disposed next to the first gate warning zone, on an opposite side of the first gate, or partially or completely overlapping with the first gate warning zone. Likewise preferably, the fourth gate warning zone is disposed next to the third gate warning zone on an opposite side of the second gate, or partially or completely overlapping with the second gate warning zone. The first gate warning zone and the second gate warning zone are preferably implemented on opposite sides of the first gate and the third gate warning zone and the fourth gate warning zone are implemented on opposite sides of the second gate. The first gate warning zone and the third gate warning zone particularly preferably extend from the gate module into the interior space of the lock. An interior space of the lock can thus be monitored by the first and third gate warning zones, while access regions to the lock are monitored by the second gate warning zone and the fourth gate warning zone. The entire interior space or the entire floor area of the lock is preferably covered by at least one gate warning zone of the first gate module and by at least one gate warning zone of the second gate module. In this way, it can be ensured that a vehicle module disposed in the interior space of the lock is detected at any time by at least one, preferably a plurality of, gate modules.

The first gate processing unit is preferably adapted for determining, based on the received configuration of the third and/or fourth gate warning zone, whether a vehicle module is present within the lock, and the second gate processing unit is preferably adapted, based on the received configuration of the first and/or second gate warning zone, for determining whether the vehicle module is present within the lock. A safety region of the lock, which is formed from the access regions to the first and second gate and from the interior space of the lock, can thus be completely monitored.

In a preferred embodiment, the first gate processing unit and the second gate processing unit are set up to send a brake signal for braking the vehicle to the vehicle module. For this purpose, the vehicle module is preferably connected to a vehicle controller of the vehicle.

The first gate processing unit and the second gate processing unit are preferably set up to send a brake signal to a second vehicle module for braking the vehicle that comprises the second vehicle module when it is determined that a first vehicle module is present in the lock. This is particularly advantageous in order to avoid a collision of vehicles in the safety region of the lock. For example, a second vehicle present in the access region of one of the gates can be braked while a first vehicle drives through the lock. A brake signal is preferably sent to both vehicle modules.

In a preferred embodiment, the first gate processing unit is adapted to receive a first state signal at the first gate interface, which first state signal indicating a first open state of the first gate, by the received first state signal of the first gate, for determining whether the first gate is in an open or closed state, and to send the determined gate state of the first gate to the second gate processing unit, wherein the second gate processing unit is preferably adapted to receive a second state signal at the second gate interface, said second state signal indicating a second open state of the second gate, by the received second state signal of the second gate, for determining whether the second gate is in an open or closed state, and to send the determined gate state of the second gate to the first gate processing unit. Information about the open state of the first and second gates is thus available both at the first gate processing unit and at the second gate processing unit. The open state is particularly preferably sent to the corresponding gate processing unit when the open state of the gate changes. The first gate processing unit is preferably set up for providing a first opening signal to open the first gate at the first gate interface, and the second gate processing unit is preferably set up for providing a second opening signal to open the second gate at the second gate interface. It can be provided that the first gate processing unit provides a first opening signal when it is determined that a vehicle module is present within the first and/or third gate warning zone. In an analogous manner, the second gate processing unit preferably provides a second opening signal when it is determined that a vehicle module is present within the second and/or fourth gate warning zone.

The first gate processing unit preferably only provides the first opening signal when it is determined that the second gate is in a closed state. It can also be preferred that the second gate processing unit only provides the second opening signal when it is determined that the first gate is in a closed state. This ensures that only one of the gates is open at a time. It should be understood that for a lock having three or more gates, it is preferred that an opening signal for a gate is only provided when it is determined that all the other gates of the lock are closed. In such an embodiment, it can be ensured that different vehicles cannot enter the lock through different gates, whereby the risk of collision is minimized. In addition, the lock is particularly suitable as an isolation lock and/or cleaning lock, for example, for a freezer warehouse.

In a preferred embodiment, the vehicle module furthermore comprises a vehicle processing unit connected to the vehicle antenna unit and which vehicle processing unit is adapted for defining at least one first vehicle warning zone for the vehicle, the first vehicle warning zone representing a sub-region of the second electromagnetic field, wherein the vehicle processing unit is adapted to send a configuration of the first vehicle warning zone to the first gate module and/or the second gate module. For further features of the vehicle warning zone and the vehicle module, reference is made in full to the above description of the vehicle warning zone and the vehicle module, as they were described for a gate safety system according to the first consideration of the invention. Particularly, reference is made to the features as laid down below.

Preferably, the first gate module is set up for determining a direction of travel of the vehicle relative to the first gate based on the received configuration of the first vehicle warning zone, and the second gate module is preferably set up for determining a direction of travel of the vehicle relative to the second gate based on the received configuration of the first vehicle warning zone. Furthermore, the first gate module can be set up for determining a direction of travel of the vehicle relative to the second gate based on the received configuration of the first vehicle warning zone. Likewise preferably, the second gate module can be set up for determining a direction of travel of the vehicle relative to the first gate based on the received configuration of the first vehicle warning zone. The first gate module is particularly preferably adapted to send the determined direction of travel of the vehicle to the second gate module. Likewise, the second gate module is preferably adapted to send the determined direction of travel of the vehicle to the first gate module. Follow-on operations of the first gate module and/or the second gate module are preferably dependent on the determined direction of travel of the vehicle relative to the first gate and/or to the second gate. To determine the direction of travel relative to the first gate and/or second gate, reference is made in full to the above description of the gate safety system according to the first consideration of the invention. Particularly, reference is made to features set out below for the gate safety system according to the first consideration of the invention.

Furthermore, it can be provided that the first gate module is set up for providing a first opening signal for opening the first gate when it is determined that the vehicle module is moving towards the first gate. In an analogous manner, the second gate module is preferably set up for providing a second opening signal for opening the second gate when it is determined that the vehicle module is moving towards the second gate. In this way, incorrect openings can be avoided when the vehicle is moving parallel to the first gate and/or the second gate.

In a preferred embodiment, the first gate module is set up for providing a first opening signal for opening the first gate when it is determined that the vehicle module is moving towards the first gate and when it is determined that there is no further vehicle module in the lock. Furthermore, the second gate module is preferably set up for providing a second opening signal for opening the second gate when it is determined that the vehicle module is moving towards the second gate and when it is determined that there is no further vehicle module in the lock. Entering a second vehicle into the lock in the event that a first vehicle is disposed in the lock can be avoided. This prevents vehicles from colliding within the lock.

It can be provided that the first gate module is adapted for providing a first opening signal when it is determined that the first vehicle module is moving away from the first gate and a second vehicle module is approaching the first gate. It can also be provided that the second gate module is adapted for providing a second opening signal when it is determined that the first vehicle module is moving away from the second gate and the second vehicle module is approaching the second gate. In this way, it is possible to prevent collisions between two vehicles in the region of the first and/or second gate and to enable efficient control of the lock. For example, it is possible for a plurality of vehicles to drive through the lock in a first direction. The first gate module is preferably adapted for providing a first opening signal only when it is determined that all vehicle modules are moving in approximately the same direction. The second gate module can preferably be implemented analogously.

In a preferred embodiment, the first gate processing unit is set up to determine whether a vehicle module matched to the first gate module has passed from the first gate warning zone to the second gate warning zone, and in response to such determination, for providing a first closing signal for closing the first gate at the first gate interface, and the second gate processing unit is also preferably set up to determine whether a vehicle module matched to the second gate module has passed from the third gate warning zone to the fourth gate warning zone, and in response to such a determination, for providing a second closing signal for closing the second gate at the second gate interface. The first and second gate warning zones are preferably disposed on opposite sides of the first gate and the third and fourth gate warning zones are disposed on opposite sides of the second gate so that a closing signal is provided when the vehicle module has entered the lock or exited the lock. The first closing signal or the second closing signal is preferably only provided when there is no further vehicle module in the first gate warning zone or third gate warning zone. The first gate processing unit is preferably set up for providing the first closing signal only when it is determined that only exactly one vehicle module is present in the first gate warning zone and the second gate warning zone, and further preferably the second gate processing unit is set up for providing the second closing signal only when it is determined that only exactly one vehicle module is present in the third gate warning zone and the fourth gate warning zone. For example, the first and/or second gate can be kept in an open state when a first vehicle module leaves the lock and a second vehicle having a second vehicle module mounted thereupon is to enter the lock.

In a variant, the second gate warning zone is disposed on a side of the first gate facing away from the second gate and the fourth gate warning zone is disposed on a side of the second gate facing away from the first gate, wherein the first gate processing unit is adapted to determine a first residence time of a first vehicle module in the second gate warning zone and to send the first residence time to the second gate module, and wherein the second gate processing unit is adapted to determine a second residence time of a second vehicle module in the fourth gate warning zone and to send the second residence time to the first gate module. The second gate warning zone and the fourth gate warning zone preferably point away from each other and are disposed on the outer sides of the gates. The residence time of the vehicle modules in front of the lock can be monitored in this way. The residence time of the first and/or second vehicle module is preferably only determined when the first vehicle module is moving towards the first gate and/or the second vehicle module is moving towards the second gate.

The first gate processing unit is preferably adapted for providing the first opening signal when the first residence time is less than the second residence time, while the second gate processing unit is adapted for providing the second opening signal when the second residence time is less than the first residence time. This makes it possible to prioritize vehicle modules according to the residence time thereof. The vehicle module that has the longest residence time in the second or fourth gate warning zone can enter the lock. However, it can also be provided that the shortest residence time is prioritized. Likewise preferably, the gate modules can be adapted for determining a plurality of residence times for a plurality of vehicle modules and for providing an opening signal for the vehicle module that has an average or otherwise defined residence time in one of the gate warning zones.

The first gate antenna is preferably disposed on a side of the first gate facing the second gate, wherein the first gate antenna unit comprises a second gate antenna which is disposed on a side of the first gate facing away from the second gate. The fourth gate antenna is also preferably disposed on a side of the second gate facing the first gate, wherein the second gate antenna unit comprises a fifth gate antenna which is disposed on a side of the second gate facing away from the first gate. This is particularly advantageous when the first gate and the second gate are provided for closing openings in walls which restrict or prevent the spread of electromagnetic fields. It can thus be ensured that both an interior space of the lock and access regions to the lock can be covered by the gate warning zone.

In a preferred embodiment, the vehicle processing unit is adapted to send a pre-stored vehicle ID to the first gate module and/or the second gate module. The first gate processing unit is preferably adapted to compare the received vehicle ID with a pre-stored security ID and for providing the first opening signal when the vehicle ID matches the security ID. Likewise, the second gate processing unit is preferably adapted to match the received vehicle ID with a pre-stored security ID and for providing the second opening signal when the vehicle ID matches the security ID. This enables several advantageous safety functions to be fulfilled. For example, incorrect opening of the first and/or second gate can be avoided particularly efficiently when a first vehicle module that does not need to pass through the first gate and/or second gate cannot cause the first and/or second gate to open, since the vehicle ID thereof differs from the security ID. Furthermore, collisions of vehicles with the first or second gate can also be avoided. For this purpose, it can be provided that vehicle modules having a vehicle ID differing from the security ID are attached to oversized vehicles. In this way, one can achieve an opening signal for opening a gate only being provided for vehicles the dimensions of which allow collision-free passage through the respective gate. Further preferably, vehicle modules, the vehicle ID of which matches the security ID, can only be mounted on vehicles that have particular safety features, such as emergency braking systems or explosion protection properties. It can also be provided that only one of the gate processing units compares a vehicle ID with a security ID. Furthermore, the first gate processing unit is preferably adapted to compare the received vehicle ID with the security ID only when the vehicle is present in the first gate warning zone or the second gate warning zone. A safety check will preferably only be performed when the vehicle approaches a gate from a particular direction. For example, a safety region can be left by any vehicle, while only vehicles equipped with the appropriate modules can enter the region through a gate/a lock.

In a fifth consideration of the invention, the object mentioned above is achieved by a method for preventing collisions between vehicles in a lock or between a vehicle and a lock, preferably using a lock safety system according to one of the preferred embodiments of a lock safety system according to the fourth consideration of the invention described above. The lock safety system preferably comprises a first gate module having a first gate antenna unit, a first gate processing unit and a first gate interface, a second gate module having a second gate antenna unit, a second gate processing unit and a second gate interface, and a vehicle module having a vehicle antenna unit. The first vehicle module is preferably mounted on a first vehicle, particularly a truck, the first gate module is mounted adjacent to a first gate, particularly a roll-up gate, and the second gate module is mounted adjacent to a second gate, particularly a roll-up gate, which is forms a lock with the first gate, wherein the method comprises the steps: generating a first three-dimensional electromagnetic field using the first gate antenna unit; defining a first gate warning zone for the first gate, the first gate warning zone representing a sub-region of the first electromagnetic field; generating a third three-dimensional electromagnetic field using the second gate antenna unit; defining a third gate warning zone for the second gate, the third gate warning zone representing a sub-region of the third electromagnetic field; generating a second three-dimensional electromagnetic field using the vehicle antenna unit; determining whether the vehicle module is present within the first gate warning zone using the first gate processing unit; sending a configuration of the first gate warning zone to the second gate processing unit; determining whether the vehicle module is present within the third gate warning zone using the second gate processing unit; and sending a configuration of the third gate warning zone to the first gate processing unit.

It should be understood that the lock safety system according to the fourth consideration of the invention and the method according to the fifth consideration of the invention have identical and similar sub-considerations. In this respect, reference is made in full to the above description of the lock safety system according to the fourth consideration of the invention. Furthermore, for identical and similar sub-considerations of the lock safety system according to the fourth consideration of the invention, reference is made in full to the above description of the gate safety system according to the first consideration of the invention. Analogously, for identical or similar sub-considerations of the method according to the fifth consideration of the invention, reference is made to the above description of the method according to the second consideration of the invention.

The method represents a sequence in which there is mutual communication between the first gate module and the second gate module. Both modules are active and detect a penetration of a vehicle module into the warning zone thereof. Furthermore, by receiving the configuration of the gate warning zone of the respective other gate module, the gate modules also detect the penetration of a vehicle module into the gate warning zone of the respective other gate module. This can significantly increase safety and the initiating of false alarms or incorrect sequence operations can be prevented by mutual plausibility checks.

The method preferably comprises the steps: determining, by the first gate processing unit, using the configuration of the third gate warning zone, whether the vehicle module is present within the lock; and determining, by the second gate processing unit, using the configuration of the first gate warning zone, whether the vehicle module is present within the lock. It should be understood that the gate processing units are also adapted, using the respective gate warning zone thereof, for determining whether the vehicle module is inside the lock. For example, the first gate processing unit, using the configurations of the first gate warning zone, can determine whether a first vehicle module is present in the lock, and in this case send the configuration of the first gate warning zone to the second gate module so that the second gate processing unit also determines that the first vehicle module is present within the lock. It can be provided that the first gate warning zone and the third gate warning zone are implemented to overlap, so that redundancy can advantageously be achieved, whereby safety is further increased.

The method preferably further comprises the steps: providing a first state signal, which indicates a first open state of the first gate, at the first gate interface of the first gate processing unit; determining, by the first gate processing unit, using the first state signal, whether the first gate is in an open or closed state; sending the determined gate state of the first gate to the second gate processing unit; providing a second state signal, which indicates a second open state of the second gate, at the second gate interface of the second gate processing unit; determining, by the second gate processing unit, using the second state signal, whether the second gate is in an open or closed state; sending the determined gate state of the second gate to the first gate processing unit. The gate processing units are therefore each adapted to detect the state of the other gate of the lock. It should be understood that the lock can also comprise more than two gates and that the gate processing units are then adapted for determining the gate states of all gates.

The method preferably further comprises the steps: providing a first opening signal at the first gate interface of the first gate processing unit when it is determined that the second gate is in a closed state; and/or providing a second opening signal at the second gate interface of the second gate processing unit when it is determined that the first gate is in a closed state. The first and second gates are only opened when the respective other gate is closed. This can prevent a first vehicle from entering the lock through the first gate and at the same time a second vehicle entering the lock through the second gate. In addition, the opening of the first gate is not based solely on the state of the first gate, but a signal from the second gate is required.

The method further preferably comprises the steps: defining a first vehicle warning zone for the vehicle, the first vehicle warning zone representing a sub-region of the second electromagnetic field; determining whether the first gate module is present within the first vehicle warning zone using the vehicle processing unit; sending a configuration of the first vehicle warning zone to the first gate processing unit when the first gate module is present in the first vehicle warning zone; determining, using a configuration of the first gate warning zone, a direction of travel of the vehicle relative to the first gate; and/or determining whether the second gate module is present within the first vehicle warning zone using the vehicle processing unit; sending a configuration of the first vehicle warning zone to the second gate processing unit when the second gate module is present in the first vehicle warning zone; determining, using a configuration of the first gate warning zone, a direction of travel of the vehicle relative to the first gate. By comparing the gate warning zone with the vehicle warning zone, it can be determined in which direction the vehicle is moving, and from this it can be determined whether the vehicle will drive through the gate.

The method further comprises the steps: determining whether a second vehicle module, which is matched to the first and second gate antenna unit and which is mounted on a second vehicle, is present within the first lock using the first gate processing unit; and determining whether a second vehicle module, which is matched to the first and second gate antenna unit and is mounted on a second vehicle, is present within the lock using the second gate processing unit. The first opening signal and/or the second opening signal for the first vehicle module is preferably only provided when it is determined that there is no second vehicle module in the lock. A gate is therefore only opened when the lock is not occupied and a vehicle is moving from outside the lock towards the corresponding gate or when the vehicle leaves the lock.

The method preferably further comprises the steps: generating a fourth three-dimensional field using a second vehicle antenna unit of the second vehicle module; defining a second vehicle warning zone for the second vehicle, the second vehicle warning zone representing a sub-region of the fourth electromagnetic field; determining whether the first gate module is present within the second vehicle warning zone using the second vehicle processing unit; sending a configuration of the second vehicle warning zone to the first gate processing unit when the first gate module is present in the second vehicle warning zone; determining, using a configuration of the first gate warning zone, a direction of travel of the second vehicle relative to the first gate; and/or determining whether the second gate module is present within the second vehicle warning zone using the second vehicle processing unit sending a configuration of the second vehicle warning zone to the second gate processing unit when the second gate module is present in the second vehicle warning zone; determining, using a configuration of the first gate warning zone, a direction of travel of the second vehicle relative to the second gate. The first opening signal is preferably only provided in the event that it is determined that the first vehicle module is moving towards the first gate and the second vehicle module is moving away from the first gate, and/or preferably the second opening signal is only provided in the event that it is determined that the first vehicle module is moving towards the second gate and the second vehicle module is moving away from the second gate. A gate can thus be opened for a second vehicle when the first vehicle moves away from the gate at the same time. In this case, there is only a low risk of collision, so that unnecessary waiting times can be avoided.

Furthermore, the method can comprise the following steps: sending a brake signal from the first gate processing unit to the first vehicle module when it is determined that a second vehicle module is present within the lock; and/or sending a brake signal from the second gate processing unit to the first vehicle module when it is determined that a second vehicle module is present within the lock. One can thus avoid a second vehicle module moving in the region of the lock while a first vehicle drives through the lock. The brake signal is particularly preferably only sent when it is determined that the first vehicle module is moving towards a gate. Likewise, the brake signal is preferably only sent when the first vehicle module and the second vehicle module approach a gate from opposite directions.

In a preferred embodiment, the method comprises the steps: sending a pre-stored vehicle ID to the first gate module, comparing the vehicle ID with a pre-stored security ID using the first gate processing unit; providing the first opening signal when the vehicle ID matches the security ID; and/or sending a pre-stored vehicle ID to the second gate module; comparing the vehicle ID with a pre-stored security ID using the second gate processing unit; providing the second opening signal when the vehicle ID matches the security ID. As a result, a gate is only opened when a vehicle is authorized to drive through the lock. Accidental entry into safety regions and/or bottlenecks can be avoided.

In a sixth consideration, the object mentioned above is achieved by a computer program, comprising commands, that brings about the lock safety system according to one of the preferred embodiments of a lock safety system described above according to the fourth consideration of the invention to perform the method steps of the method according to one of the preferred embodiments of a method according to the fifth consideration of the invention described above.

It should be understood that features of the gate modules and/or the vehicle modules of the lock safety system can be implemented to be identical or similar to features of the gate modules and/or vehicle modules of the gate safety system according to the first consideration of the invention, which is why fully comprehensive reference is made to the description above.

Embodiments of the invention are described below using the drawings. Said drawings are not necessarily intended to depict the embodiments to scale; rather, the drawings are shown in schematic and/or slightly distorted form for explanatory purposes. With respect to supplements to the teachings directly discernible from the drawings, reference is made to the applicable prior art. It must thereby be considered that various modifications and changes relating to the shape and detail of an embodiment can be made without deviating from the general idea of the invention. The features of the invention disclosed in the description and in the drawings can be important to the refinement of the invention individually and in any arbitrary combination. All combinations of two or more features disclosed in the description, the drawings, and/or the claims also fall within the scope of the invention. The general idea of the invention is not limited to the precise form or the detail of the preferred embodiments shown and described below or limited to a subject-matter that would be limited in comparison with the subject-matter claimed in the claims. Where dimensional ranges are indicated, values within the stated limits should also be disclosed as limit values and arbitrarily usable and claimable. For simplicity, identical reference numerals are used below for identical or similar parts or parts having identical or similar functions.

BRIEF DESCRIPTION OF THE DRAWINGS

The accompanying drawings, which are incorporated in and constitute a part of this specification, illustrate one or more embodiments of the invention and, together with the general description given above and the detailed description given below, explain the one or more embodiments of the invention. Further advantages, features, and details of the invention result from the below description of the preferred embodiments and from the following drawings.

DETAILED DESCRIPTION

Figure 1:
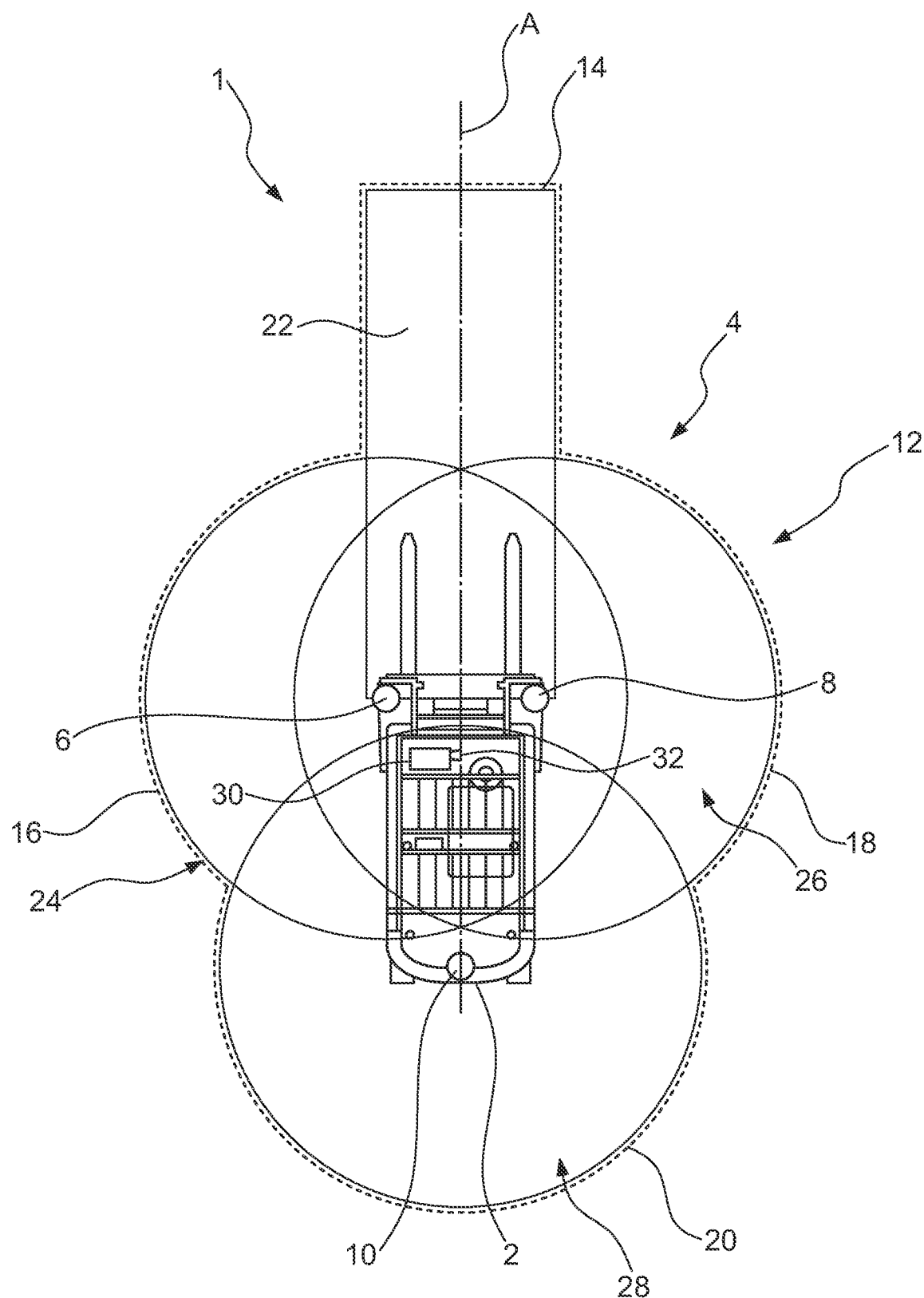
FIG. 1 is a plan view of a vehicle having a vehicle module and a first, second, third and fourth vehicle warning zone.

According to FIG. 1, a vehicle system 1 comprises a vehicle 2, here a truck, and a vehicle module 4. Even when the vehicle 2 is shown here as a truck, it should be understood that it can be used on all types of vehicles, particularly also autonomous, driverless transport systems, wheel loaders, cars, lorries, etc. The vehicle 2 is shown here from above and in the form of a forklift truck. Forklift trucks are widely used, and it is precisely here that it has been shown that accidents with gates 5 (see FIG. 3) occur relatively frequently. The vehicle module 4 comprises a vehicle antenna unit 7 having a first vehicle antenna 6, a second vehicle antenna 8 and a third vehicle antenna 10. The first and second vehicle antennas 6, 8 here are disposed at the left and right corners of the front of the vehicle 2, and the third vehicle antenna 10 is disposed at the rear of the vehicle 2. Together, the first, second and third vehicle antennas 6, 8, 10 form a vehicle antenna unit 12. The vehicle antenna unit 12 monitors a vehicle monitoring region 14 (overall vehicle warning zone 14), which is shown here by the dashed line. All three vehicle antennas 6, 8, 10 each span a spherical electromagnetic field 16, 18, 20, which is illustrated schematically by the circles. The circles only illustrate the electromagnetic field 16, 18, 20, but it should be understood that the actual range of the vehicle antennas 6, 8, 10 is significantly greater and, in reality, can be up to 200 meters. However, account is to be taken of shielding effects that can be caused by the vehicle 2 or a corresponding load of the vehicle 2.

According to this embodiment, the overall vehicle warning zone 14 has a first vehicle warning zone 22 which extends from the vehicle front substantially in the direction of the longitudinal axis A of the vehicle 2 in the direction of travel. The overall vehicle warning zone 14 further comprises a second vehicle warning zone 24, a third vehicle warning zone 26 and a fourth vehicle warning zone 28. The second and third vehicle warning zones 24, 26 are disposed to the side of the vehicle 2, the fourth vehicle warning zone 28 is disposed at the rear of the vehicle 2. The second, third and fourth vehicle warning zones 24, 26, 28 are designed to be narrow compared to the first vehicle warning zone 22. The vehicle 2 will generally move forward in the direction of travel so that the side and rear regions with the second, third and fourth vehicle warning zones 24, 26, 28 can be designed to be narrow.

The vehicle module 4 furthermore comprises a vehicle processing unit 30 connected to the first, second and third vehicle antennas 6, 8, 10 in order to span the electromagnetic fields 16, 18, 20. The vehicle processing unit 30 has a vehicle interface 32 in order to communicate with a vehicle controller or other units of the vehicle 2.

Figure 2:
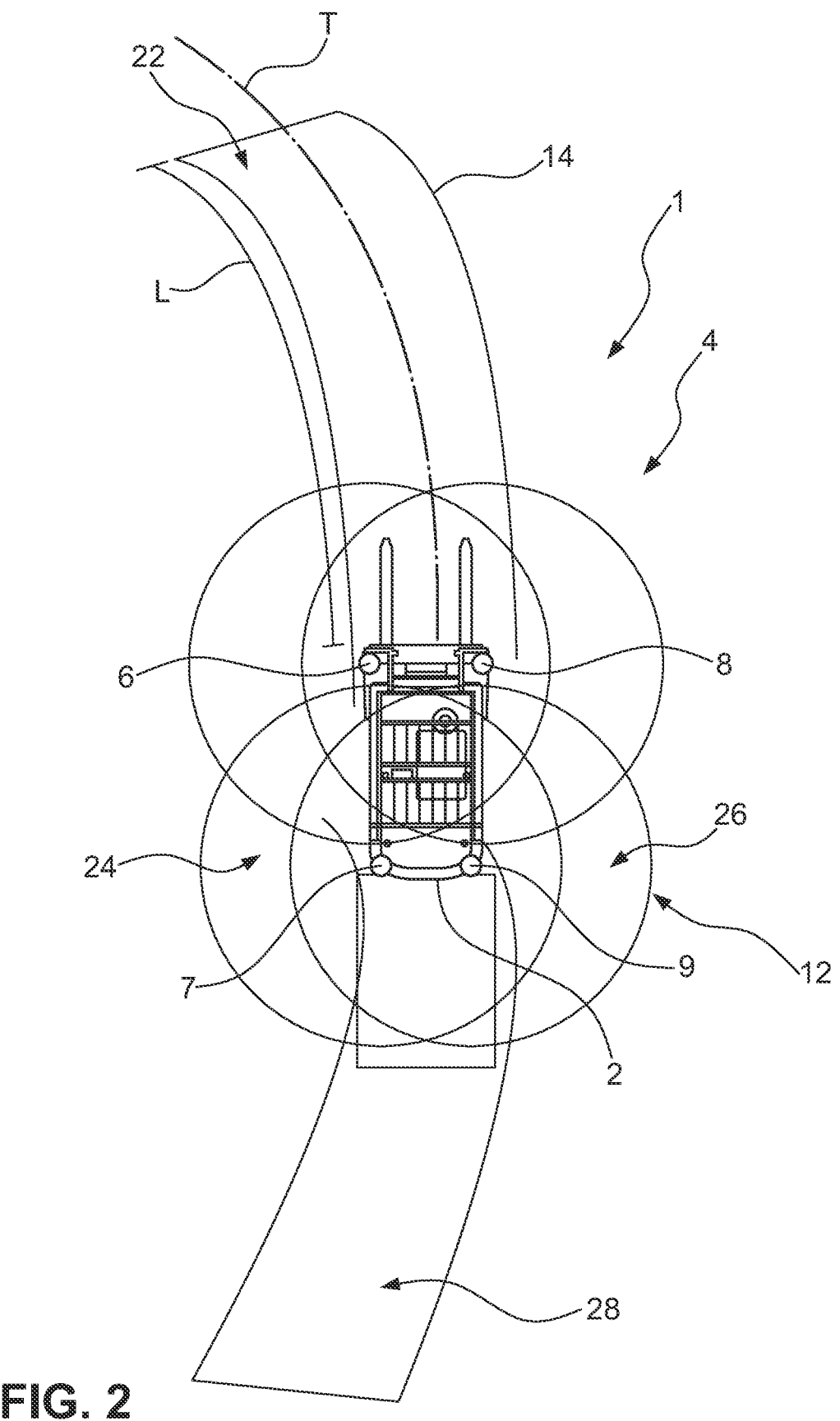
FIG. 2 is a plan view of a vehicle with six warning zones.

In a variant of FIG. 1, FIG. 2 shows a vehicle module 4 comprising a total of 4 vehicle antennas 6, 8, 7, 9 which are used to monitor the overall vehicle warning zone 14. In addition, a further antenna can be provided for muting a sub-region of the first overall vehicle warning zone 14. In contrast to the first embodiment, according to this embodiment (FIG. 2), two vehicle antennas 7, 9 are disposed at the rear of vehicle 2, specifically also at corners of vehicle 2, so that the four vehicle antennas 6, 8, 7, 9 represent a rectangle overall. FIG. 2 also shows a warning zone configuration, as is preferred for high speeds and tight cornering. The first vehicle warning zone 22 is elongated in the direction of travel and oriented slightly to the left in order to cover a curve trajectory T of the vehicle 2. If, for example, a steering angle sensor detects that the vehicle 2 wants to turn left along the trajectory T with reference to FIG. 2, it is preferred to form the first vehicle warning zone 22, as shown in FIG. 2, that is, to move preferably with the trajectory T in order to cover the region in which the vehicle 2 will be in the near future. A length L of the first vehicle warning zone 22 can, for example, include 2.5 times the vehicle length, or, for example, with reference to the driving speed of the vehicle 2, it can cover the next 2 to 10 seconds.

Furthermore, a vehicle warning zone 28, here the fifth, is also provided at the rear of the vehicle 2, which vehicle warning zone is also substantially rectangular. The fifth vehicle warning zone 28 can only be activated when the vehicle 2 is reversing, for example.

Figure 3:
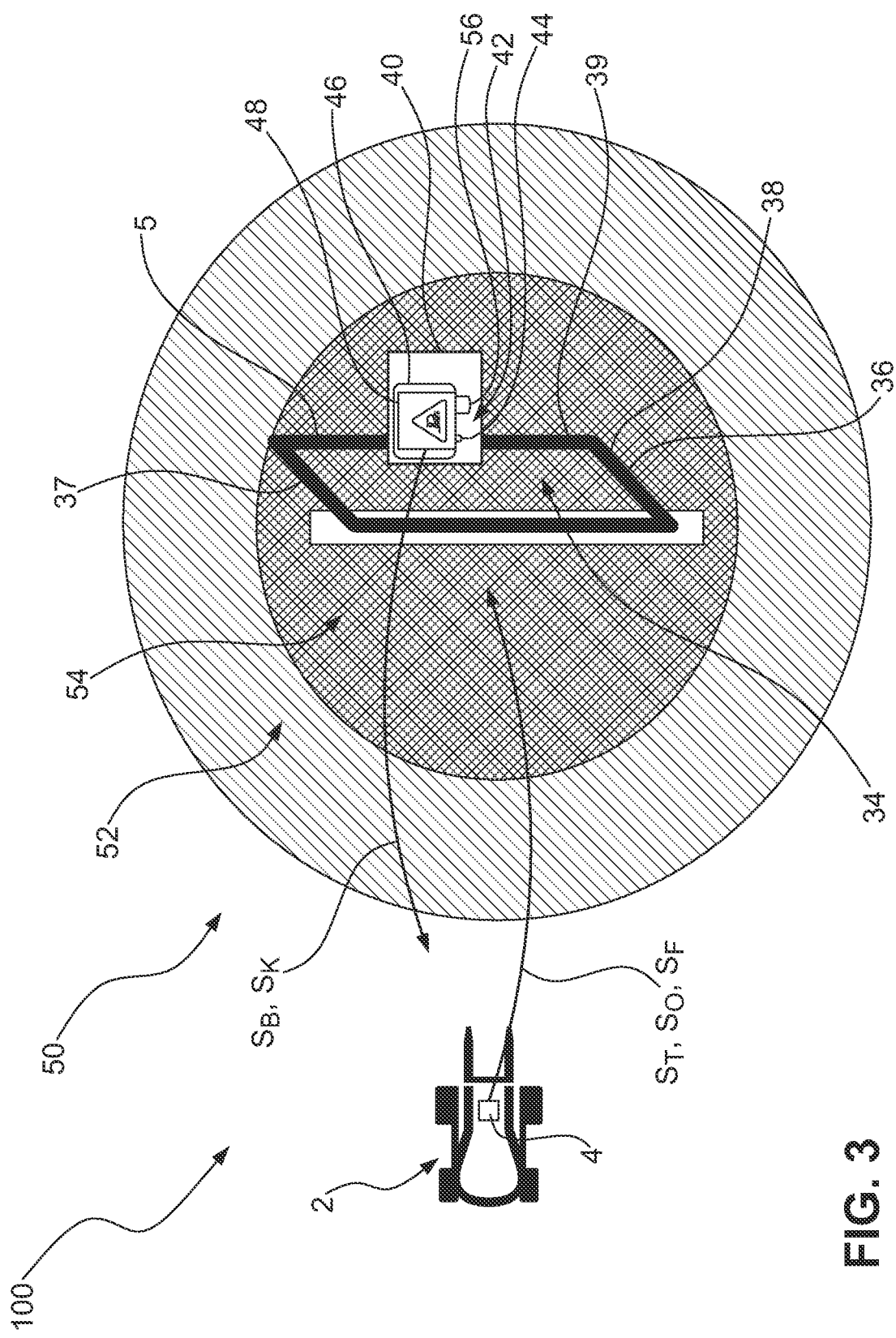
FIG. 3 is a schematic view of a gate having a gate module and a first and second gate warning zone.

In FIG. 3, a gate 5 is initially only schematically illustrated, which can be a roll-up gate of a warehouse, for example. The gate 5 comprises a gate opening 34 and a gate frame 36. The gate frame 36 comprises first and second vertical struts 37, 38, which are disposed parallel to each other, and a horizontal cross strut 40. In this embodiment, a crossbeam 39, a gate module 40, is disposed above the cross strut 40. The gate module 40 comprises a gate antenna unit 42 having a first gate antenna 44 and a gate processing unit 46. The gate processing unit 46 is used here together with the gate antenna unit 42 in a housing 48 which, together with the gate antenna unit 42 and the gate processing unit 46, can be mounted, for example, centrally above the crossbeam 39 in order to mount the first gate antenna 44 in a predetermined spatial relationship to the gate frame 36 of the gate 5.

The gate antenna unit 42 is set up to generate a first three-dimensional electromagnetic field 50 having a wavelength of 780 nm or more. In this embodiment (FIG. 3), the gate processing unit 46 generates a first gate warning zone 52 and a second gate warning zone 54. Both gate warning zones 52, 54 are circular in a projection in this embodiment, since the gate antenna unit 42 comprises only a single first gate antenna 44 in this embodiment. The first gate warning zone 52 is larger than the second gate warning zone 54, wherein the two gate warning zones 52, 54 are implemented concentrically to each other. That is, when a vehicle 2 approaches the gate 5, the vehicle module 4 first comes into the first gate warning zone 52 and then into the second gate warning zone 54. It is preferably provided that the first gate warning zone 52 is associated with a first gate activity set having at least one first gate follow-on operation and a second gate activity set having at least one second gate follow-on operation. Such a gate follow-on operation can, for example, comprise a flashing of a signal lamp on the gate module 40, or also the activation of the second gate warning zone 54. For example, it can be provided that the first gate activity set is activated when no vehicle module 4 is determined in the first gate warning zone 52, as shown in FIG. 3, for example. If the vehicle module 4 then enters the first gate warning zone 52 because the vehicle 2 is moving further in the direction of the gate 5, the second gate activity set can be activated. It is also conceivable that, for example, a brake signal SB or a configuration signal SK, which indicates the configuration of the first gate warning zone 52 and/or the second gate warning zone 54, is sent to the vehicle module 4 by the gate module 40. Based on such configuration signals SK, it is then also conceivable that the vehicle module 4 automatically determines whether it is present within the first and/or second gate warning zone 52, 54.

The gate module 40 further comprises a gate interface 56 for connection to a controller of the gate 5. The gate controller is not shown in the figures but is generally used to open and close the gate 5. The gate module 40 can also receive an open state of the gate 5 by the gate interface 56, preferably also a degree of opening and an opening speed.

The vehicle module 4 is also provided to send signals to the gate module 40. The vehicle module 4 can provide a trajectory signal ST, for example, which comprises a probable movement path of the vehicle 2 and is determined based on acceleration sensors, steering angle sensors, speed sensors or the like. It is also conceivable that the vehicle comprises GPS sensors or the like. The vehicle module 4 can also send an opening signal SO to the gate module 40, for example, when the vehicle module 4 determines that a gate module 40 is within the first vehicle warning zone 22. The vehicle module 4 can further be set up to send a vehicle warning zone configuration SF to the gate module 40.

The gate module 40 and the vehicle module 4 together form a gate safety system 100.

Figure 4:
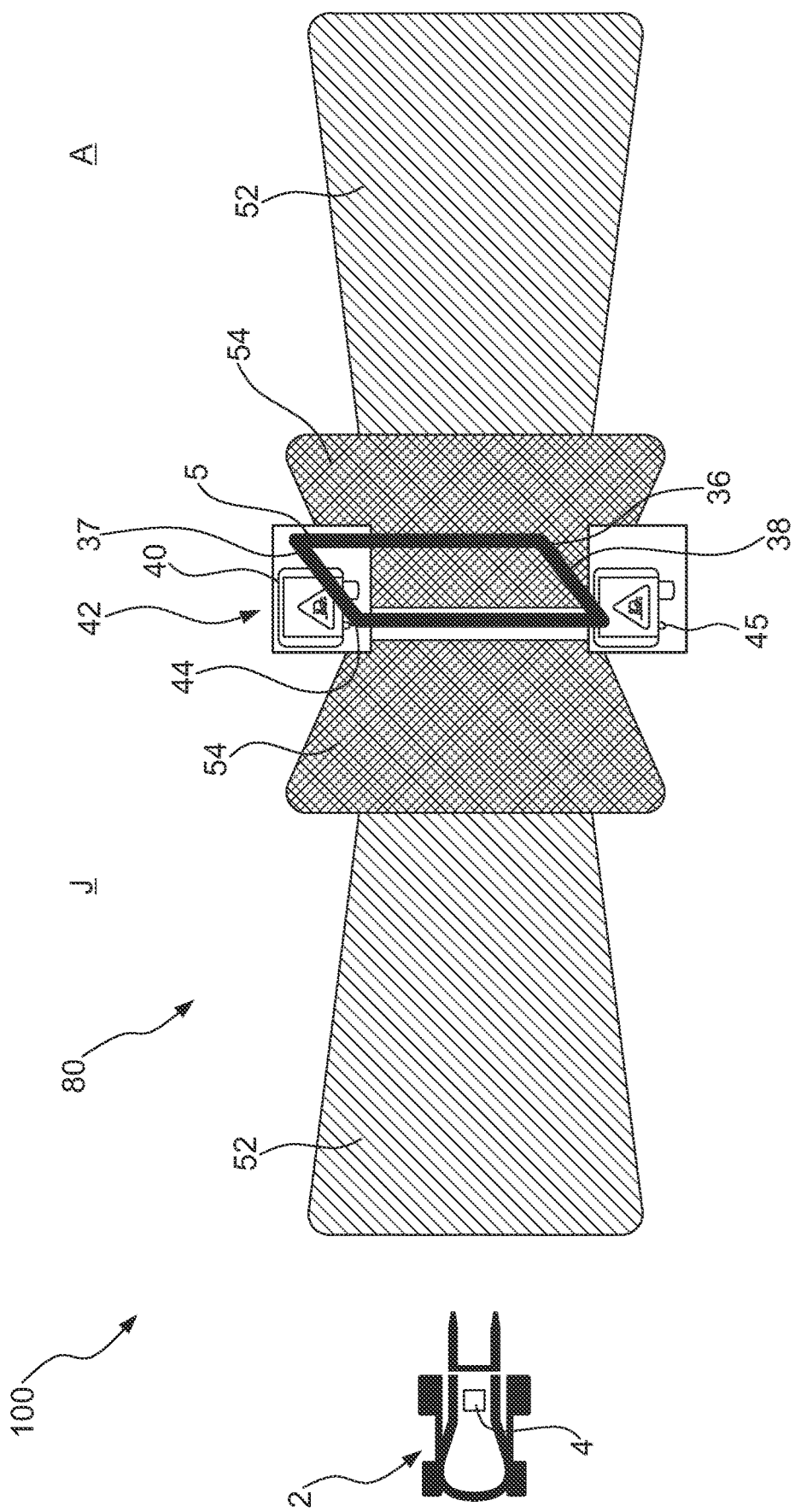
FIG. 4 is a schematic view of a gate having a gate module and four gate warning zones.

FIG. 4 shows a variant of FIG. 3. The embodiment shown in FIG. 4 differs from the one shown in FIG. 3 in that the gate antenna unit 42 comprises a first gate antenna 44 and a second gate antenna 45. The first gate antenna 44 is disposed on the first vertical support 37 and the second gate antenna is disposed in the second vertical support 38 of the gate frame 36. In this way, it is possible for the first and second gate warning zones 52, 54 to have a shape that deviates from a circular shape, namely substantially trapezoidal in this embodiment, wherein the respective trapezoids widen in the direction away from the gate 5. The first gate warning zone 52 is in turn larger than the second gate warning zone 54 or is further away from the gate 5. When there are two gate antennas 44, 45, it is not yet possible to distinguish whether, when a vehicle module 4 is detected in the first gate warning zone 52, the vehicle module is present inside I or outside A of the hall in the hall wall of which the gate 5 is installed. To this end, a third gate antenna can be provided (not shown), which is not disposed in the plane defined by the gate 5 but, with reference to FIG. 4, for example, at the level of the vehicle 2. In this way, it can then be determined by trigonometry whether the vehicle module 4 is inside or outside the gate 5.

Figure 5:
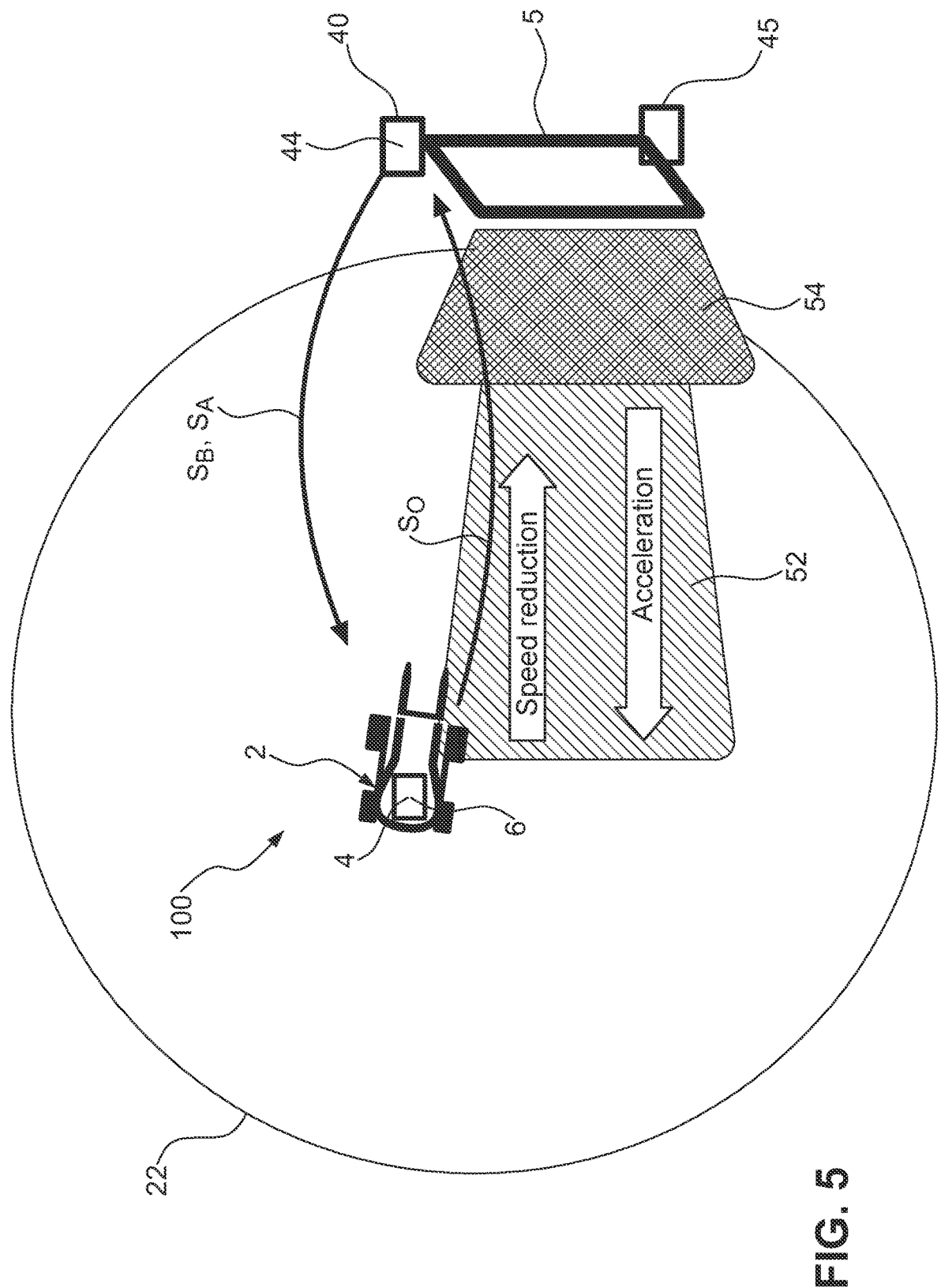
FIG. 5 is a schematic diagram of the interaction of a vehicle with a gate in a first embodiment.

In the embodiment shown in FIG. 5, the first vehicle warning zone 22 is circular, since in this embodiment, the vehicle module 4 comprises only a single vehicle antenna 6. The gate module 40 is in turn equipped with two gate antennas 44, 45, so that the first gate warning zone 52 and the second gate warning zone 54 are trapezoidal. In FIG. 5, it is shown that the vehicle 2 is moving in the direction of the gate 5 and is entering the first gate warning zone 52. The gate module 40 determines this. Furthermore, the gate module 40 is also set up for determining that the vehicle 2 is moving in the direction of the gate 5. This can be done, for example, by observing a signal strength, wherein it is determined that the vehicle module 4 is in the first gate warning zone 52 and the signal strength increases over time, the vehicle module 4 is moving in the direction of the gate 5. It can be provided that as soon as the vehicle module 4 enters the first gate warning zone 52 and the gate processing unit 46 determines that the vehicle module 4 is present within the first gate warning zone 52, a brake signal SB from the gate module 40 is sent to the vehicle module 4. As soon as the gate module 40 determines that the vehicle module 4 is moving away from the gate 5, the brake signal SB is no longer sent, or an acceleration signal SA is sent which allows the vehicle 2 to be accelerated. In FIG. 5, the vehicle 2 is in a position in which the gate module 40 is not yet in the first vehicle warning zone 22. As soon as the vehicle 2 moves further towards the gate 5, the gate module 40 comes into the first vehicle warning zone 22 and the vehicle processing unit 30 determines that the gate module 40 is present in the first vehicle warning zone 22. The vehicle module 4 is then implemented to send an opening signal SO to the gate module 40, which in turn provides a corresponding opening signal to the gate controller by the gate interface 56 in order to open the gate 5. In this way, the two modules, the vehicle module 4 and the gate module 40 communicate with each other and exchange signals with each other.

Figure 6B:
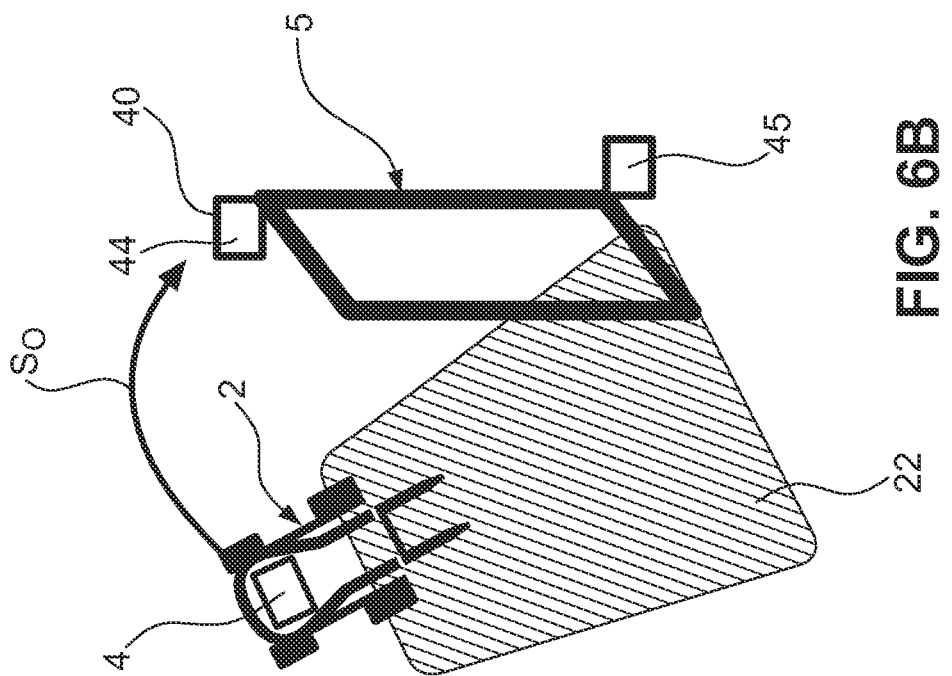
FIGS. 6A and 6B are schematic diagrams of the interaction of a vehicle with a gate in a second embodiment.
Figure 6A:
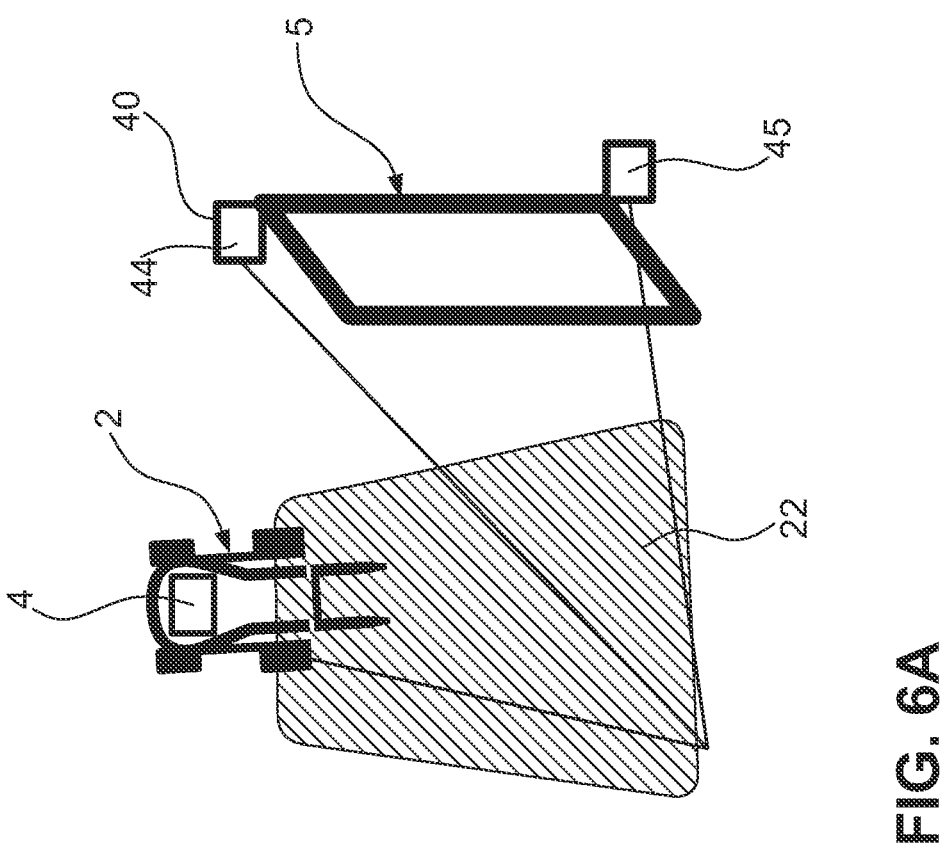

FIGS. 6A, 6B now illustrate a variant in which a vehicle 2 initially travels substantially parallel to the gate 5 (see FIG. 6A) and then turns in the direction of the gate 5. The first vehicle warning zone 22 extends elongated at the front of the vehicle 2 and is oriented substantially in the direction of travel. In this embodiment, it is approximately trapezoidal, wherein the trapezoid widens away from the front of the vehicle 2. If the vehicle 2 is travelling substantially parallel to the gate 5, the gate module 40 does not get into the first vehicle warning zone 22. Consequently, the vehicle module 4 also does not send an opening signal SO to the gate module 40. If the vehicle 2 now turns, as shown in FIG. 6B, and as a result the gate module 40, more precisely the second gate antenna 45 in FIG. 6B, comes into the first vehicle warning zone 22, the vehicle processing unit 30 detects that the gate module 40 is in the first vehicle warning zone, and initiates the sending of an opening signal SO from the vehicle module 4 to the gate module 40 as a follow-on operation.. The gate module 40 then provides the opening signal SO or a signal derived therefrom at the gate interface 56 and the gate controller can open the gate 5.

Figure 7:
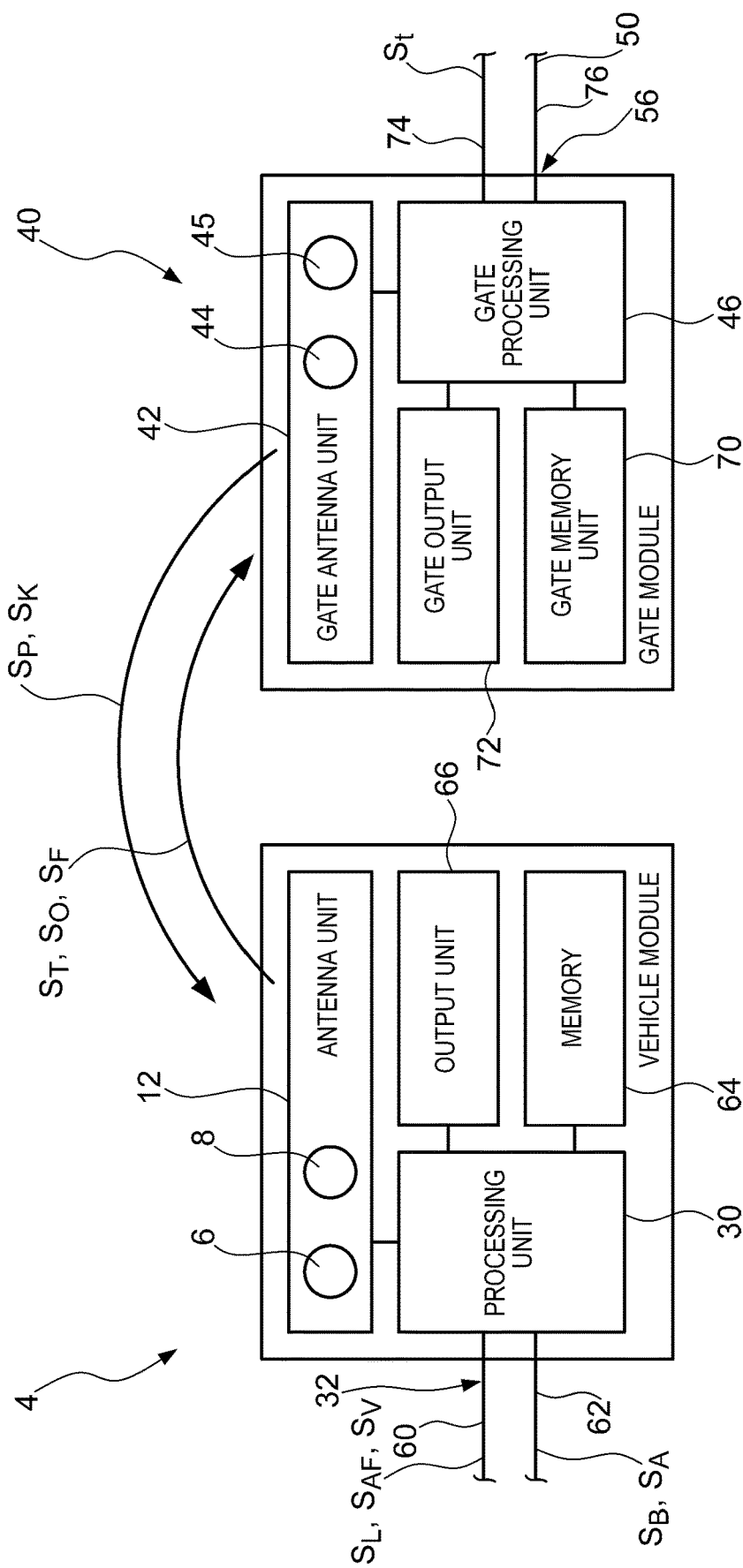
FIG. 7 is a schematic block diagram showing the structure of the gate module and the vehicle module.

FIG. 7 schematically shows a vehicle module 4 and a gate module 40. As already described above, the vehicle module 4 comprises an antenna unit 12, having a first vehicle antenna 6 and a second vehicle antenna 8 shown here. The processing unit 30 is connected to the antenna unit 12 and further comprises a vehicle interface 32. In this embodiment, the vehicle interface 32 is shown with a first line 60 and a second line 62, wherein the first line 60 is implemented to receive signals such as a steering angle signal SL, an acceleration signal of the vehicle SAF and a speed signal of the vehicle SV. The second line 62 is provided for outputting signals from the vehicle module 4 to the vehicle 2, such as the brake signal SB and the acceleration signal SA. In addition to these units, the vehicle module 4 further comprises a memory 64 in which, for example, configurations for the first and second vehicle warning zones 22, 24, 26, 28 can be stored. Finally, the vehicle module 4 comprises an output unit 66 which can output optical and/or acoustic signals, for example, for warning a driver of the vehicle 2.

In the same way, the gate module 40 comprises the gate antenna unit 42, the gate processing unit 46, a gate memory unit 70 and a gate output unit 72. The gate interface 56 in turn comprises a first line 74 and a second line 76, wherein the first line 74 is implemented to receive signals from a gate controller, such as particularly a gate state signal. The second line 76 is provided for outputting signals to the gate controller, for example, a gate opening signal SO.

The two modules, the vehicle module 4 and the gate module 40 communicate with each other by radio. For example, the vehicle module 4 can send the signals ST, SO, SF to the gate module 40 by the antenna unit 12 or a further transmitting/receiving unit, and the gate module 40 can send the signals SB, SK to the vehicle module 4 in the same way.

Figure 8:
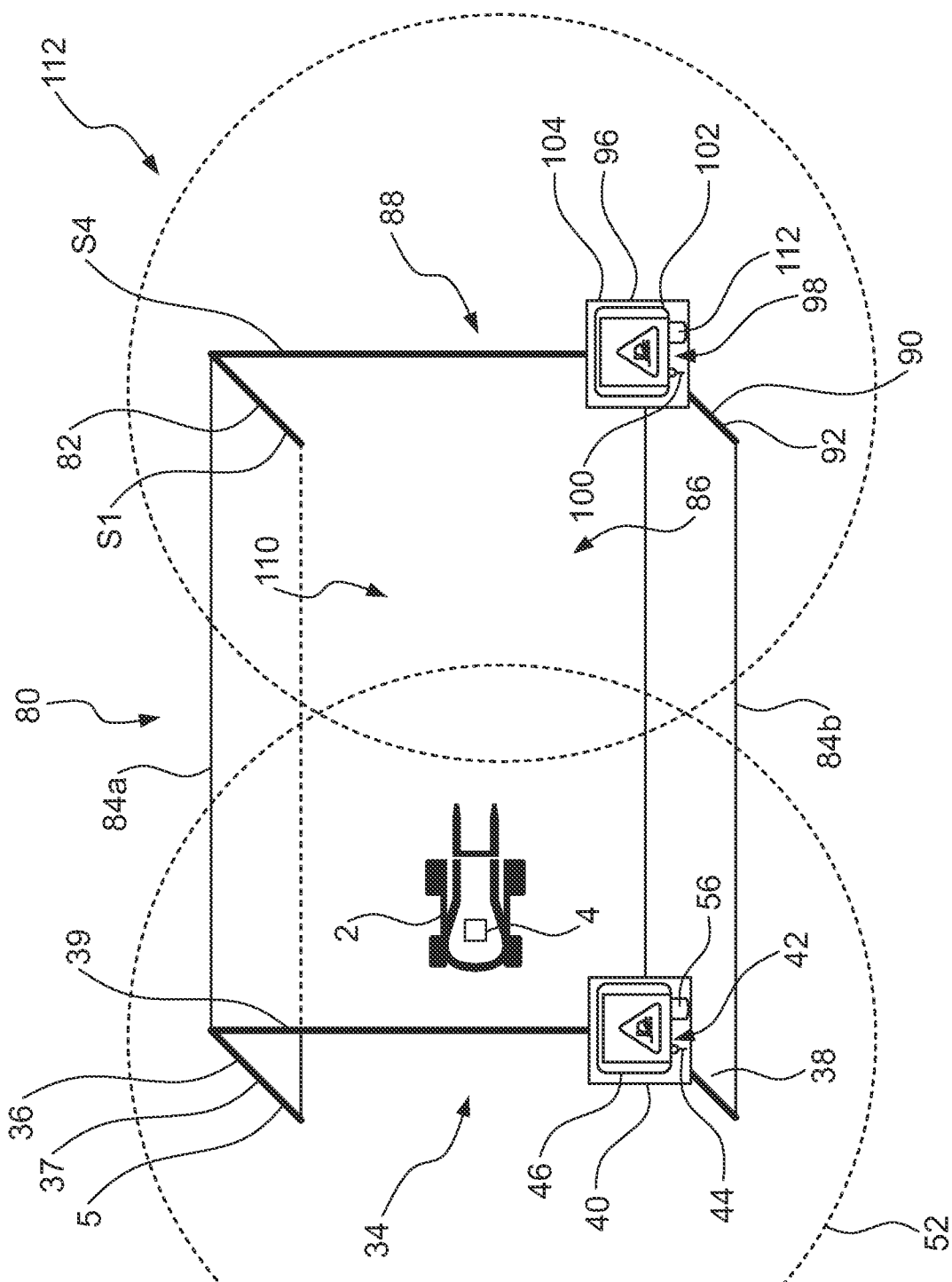
FIG. 8 is a schematic plan view of a lock with a first gate, a second gate, a first gate warning zone and a third gate warning zone.

FIG. 8 illustrates a lock 80 which is formed by a first gate 5 and a second gate 82. The lock 80 further comprises side walls 84a, 84b which laterally delimit the lock 80 and define an interior space 86 of the lock 80. It should be understood that the lock 80 can also be delimited by other elements, such as fences, or can be implemented to not be delimited.

The first gate 5 comprises a gate opening 34 and a gate frame 36. In an analogous manner, the second gate 82 comprises a second gate opening 88 and a second gate frame 90. The second gate frame 90 is formed by third and fourth vertical struts 91, 92 and a second crossbeam 94. The first gate 5 and the second gate 82 are preferably implemented as roll-up gates. A first gate module 40 is disposed above the cross strut 39 of the first gate 5 and comprises a first gate antenna unit 42 having a first gate antenna 44 and a first gate processing unit 46. A second gate module 96 is disposed above the second crossbeam 94 of the second gate 82 and comprises a second gate antenna unit 98 having a fourth gate antenna 100 and a second gate processing unit 102. The second gate processing unit 102 and the second gate antenna unit 98 are inserted into a second housing 104, which can then be mounted, for example, in the center above the crossbeam 94, in order to mount the fourth gate antenna 100 in a predetermined spatial relationship to the second gate 82. The second gate module 96 further comprises a second gate interface 112, which is provided for connection to a controller of the second gate 82. The gate controller is not shown in the figures but is generally used to open and close the gate 82. By the second gate interface 112, the second gate module 96 can receive a second state signal which indicates a second open state of the second gate 82. Furthermore, the second state signal can also contain further information, such as an opening speed or damage reports. In an analogous manner, the first gate module 40 is connected to a gate controller (not shown in the figures) of the first gate 5 by the first gate interface 56.

The first gate antenna unit 42 is set up to generate a first three-dimensional electromagnetic field 50 (not shown in FIG. 8) and the second gate antenna unit 98 is set up to generate a third three-dimensional electromagnetic field 106 (not shown in FIG. 8) that has a wavelength of 780 nm or more. In this embodiment, the second gate processing unit 102 generates a third gate warning zone 108, which overlaps with a first gate warning zone 52, which is defined by the first gate processing unit 46, in the interior space 86 of the lock 80. The third gate warning zone 108 represents a sub-region of the third three-dimensional electromagnetic field 106. Since the first gate antenna unit 42 and the second gate antenna unit 98 each comprise only one gate antenna 44, 100 in this embodiment, the first gate warning zone 52 and the third gate warning zone 108 are circular in a projection. The first gate warning zone 52 and the third gate warning zone 108 preferably overlap in the interior space 86 of the lock 80 such that a floor area 110 of the lock 80 is completely covered by the gate warning zones 52, 108.

A vehicle 2, which is shown here as a truck, comprises a vehicle module 4 that is matched to the first gate antenna unit 42 and the second gate antenna unit 98. Here, the vehicle 2 is disposed within the first gate warning zone 52 in the interior space 86 of the lock 80. The first gate processing unit 46 therefore determines, using the first gate antenna unit 44, that the vehicle module 4 is present within the first gate warning zone 52. In response to such a determination, the first gate module 40 sends the configuration of the first gate warning zone 52 to the second gate module 96. The information that a vehicle 2 is present in the region of the lock 80 is then also available on the second gate module 96. The second gate module 96 can perform one or more follow-on operations based on the received configuration of the first gate warning zone 52. For example, the second gate module 96 can determine a second open state of the second gate 82 by the second gate interface 112. When the second gate processing unit 102 determines that the second gate 82 is closed, a second opening signal SO2 can be provided at the second gate interface 112, for example. This opens the second gate 82 and collisions between the vehicle 2 and the second gate 82 can advantageously be avoided. Further follow-on operations can also take place, such as sending a brake signal SB to the vehicle 2 or outputting an optical and/or acoustic warning signal. For this purpose, the first gate module 40, the second gate module 96 and/or the vehicle module 4 preferably comprise one or more signal transmitters.

The first gate module 40, the second gate module 96 and the vehicle module 4 here form a lock safety system 114.

Figure 9:
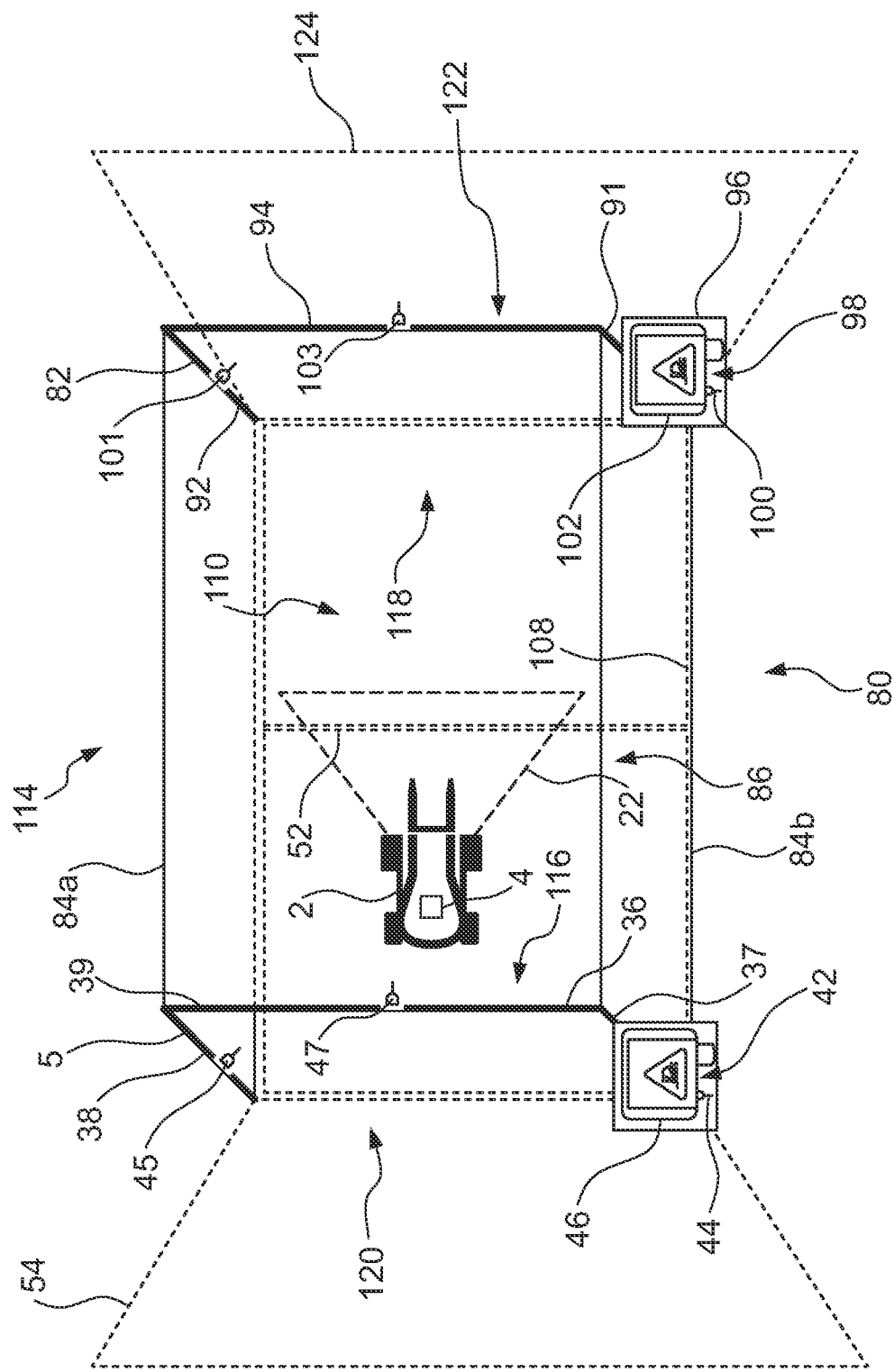
FIG. 9 is a schematic plan view of a lock safety system according to a fourth embodiment having a first gate module which defines a first and second gate warning zone, and a second gate module which defines a third and fourth gate warning zone.

The embodiment shown in FIG. 9 represents a variant of the lock safety system 114 of FIG. 8. The lock safety system 114 shown differs from that of FIG. 8 in that the first gate antenna unit 42 comprises a second gate antenna 45 and a third gate antenna 47 in addition to the first gate antenna 44. The first gate antenna 44 is disposed on the first vertical support 37, the second gate antenna 45 on the second vertical support 38 and the third gate antenna 47 on the crossbeam 39 of the gate frame 36 of the first gate 5. The second gate antenna unit 98 comprises, in addition to the fourth gate antenna 100, a fifth gate antenna 101 and a sixth gate antenna 103, wherein one of the antennas is disposed on the third vertical strut 91, the fourth vertical strut 92 and on the second crossbeam 94 of the second gate frame 90. By the three gate antennas 44, 45, 47, 100, 101, 103, the first gate processing unit 46 and the second gate processing unit 102 are adapted for defining any shape of the gate warning zones. In this embodiment, the first gate warning zone 52 is rectangular in a projection and extends on a first inner side 116 of the first gate 5 over half of the floor area 110 of the interior space 86 of the lock 80. The third gate warning zone 108 is symmetrical to the first gate warning zone 52 and extends on a second inner side 118 of the second gate 82 over the second half of the floor area 110 of the interior space 86. The second gate warning zone 54, which is defined by the first gate processing unit 46, is implemented in a trapezoidal projection on a first outer side 120 of the first gate 5, wherein the second gate warning zone 54 widens from the first gate 5. The second gate processing unit 102 defines a fourth gate warning zone 124, which is also trapezoidal in a projection on a second outer side 122 of the second gate 82. The fourth gate warning zone 124 here is defined symmetrically to the second gate warning zone 54, but it can also be provided that the shape of the gate warning zones 52, 54, 108, 124 is defined completely individually. In addition, it can be provided that the first gate warning zone 52 and the third gate warning zone 108 partially or completely overlap. Redundancy can advantageously be achieved in this way, whereby the safety of the lock safety system 114 is further increased.

It can be provided that the first gate module 40 only comprises a first gate antenna 44 and a second gate antenna 45, wherein the first gate warning zone 52 and the second gate warning zone 54 are preferably then symmetrical. It should be understood that a trapezoidal design of the gate warning zones is also possible with only two gate antennas. In addition, an individual design of the gate warning zone on opposite inner sides 116, 118 and outer sides 120, 122 of a gate 5, 82 can also be achieved with only two gate antennas per gate antenna unit 42, 98. For example, this is particularly easy when the side walls 84a, 84b of the lock 80 prevent the spread of electromagnetic fields.

The first gate module 40 and the second gate module 96 are each adapted for determining whether the vehicle module 4 is present in one of gate warning zones thereof 52, 54, 108, 124. Furthermore, the first gate module 40 and the second gate module 96 are adapted, in response to a determination that the vehicle module 4 is present in one of the gate warning zones thereof 52, 54, 108, 124, to send the configuration of the gate warning zone to the other gate module. The first gate module 40 and/or the second gate module 96 is preferably adapted, using the received configuration of the gate warning zone of the respective other gate module or using the configuration of the gate warning zone thereof of the lock 80, for determining whether the vehicle module 4 is present in the interior space 86 in the region of the first outer side 120 or in the region of the second outer side 122. This is particularly easy when the first gate warning zone 52 and the second gate warning zone 54 are disposed on opposite sides of the first gate 5 and when the third gate warning zone 108 and the fourth gate warning zone 124 are disposed on opposite sides of the second gate 82. However, it should be understood that the gate warning zones 52, 54, 108, 124 can also be disposed so that said gate warning zones completely or partially overlap and/or are on the same sides of the gates.

The vehicle module 4 is preferably also provided to send signals to the first gate module 40 and/or the second gate module 96. For example, the vehicle module 4 can provide an opening signal SO and/or a trajectory signal ST, which comprises an expected movement path of the vehicle 2. The vehicle module 4 particularly preferably defines a vehicle warning zone 22 representing a sub-region of a second three-dimensional electromagnetic field that is generated by a vehicle antenna unit 7 of the vehicle module 4. The vehicle warning zone 22 here extends as a trapezoid forward in the direction of travel of the vehicle 2. For reasons of illustration, the vehicle warning zone 22 is shown here on a reduced scale. The vehicle module 4 is preferably adapted to send the configuration of the vehicle warning zone 22 to the first gate module 40 and the second gate module 96. It can be provided for the configuration of the vehicle warning zone 22 to be sent as soon as a gate module 40, 96 is disposed within the second three-dimensional electromagnetic field. The second three-dimensional electromagnetic field is not shown in the figures for reasons of clarity, but it should be understood that it preferably extends in all spatial directions starting from the vehicle module. It can also be preferred to send the configuration of the vehicle warning zone 22 when it is determined that a gate module 40, 96 is present in the vehicle warning zone 22. The vehicle module 4 is particularly preferably adapted to detect whether said vehicle module is present in the electromagnetic field of a gate module 40, 96 and, in response to such determination, to send the configuration of the vehicle warning zone 22 to the gate module 40, 96.

The gate modules 40, 96 are preferably adapted, using the configuration of the vehicle warning zone 22, for determining a direction of travel of the vehicle 2 relative to the gate. In response to the determination of whether a vehicle module 4 is present within the lock 80 and/or in response to the determination of the direction of travel of the vehicle 2, the gate modules preferably carry out one or more follow-on operations. It should be understood that the vehicle module 4 can also define a plurality of vehicle warning zones. The vehicle module 4 particularly preferably defines two vehicle warning zones, one of which extends forwards and backwards in the direction of travel of the vehicle 2. A width of the first vehicle warning zone 22 is particularly preferably greater than or equal to a width of the first gate 5 and greater than or equal to a width of the second gate 82.

In this embodiment (FIG. 9), the first gate processing unit 46 determines that the vehicle module 4 is present in the first gate warning zone 52 and then sends the configuration of the first gate warning zone 52 to the second gate module 96. The first gate module 52 preferably determines, using the first vehicle warning zone 22, that the vehicle module 4 is moving away from the first gate 5. In response to determining the direction of travel, the first gate module 52 preferably provides a closing signal STS at the first gate interface 56, so that the first gate 5 is closed. The first gate processing unit 46 then determines, using the first state signal SZ1, that is present at the first gate interface 56, that the first gate 5 is in a closed state. The first gate module 40 then sends the open state of the first gate 5 to the second gate module 96. The second gate module 96 receives the configuration of the first gate warning zone 52 and the configuration of the vehicle warning zone 22 and determines that the vehicle 2 is moving towards the second gate 82. In response to this determination, the second gate processing unit 102 provides a second opening signal SO2 at the second gate interface 112, so that the second gate 82 is opened. The second gate processing unit 102 preferably only provides the second opening signal SO2 when the first gate 5 is closed. It can thus be ensured that only one of the gates 5, 82 is ever open. Furthermore, collisions between vehicle 2 and lock 80 are avoided.

Figure 10:
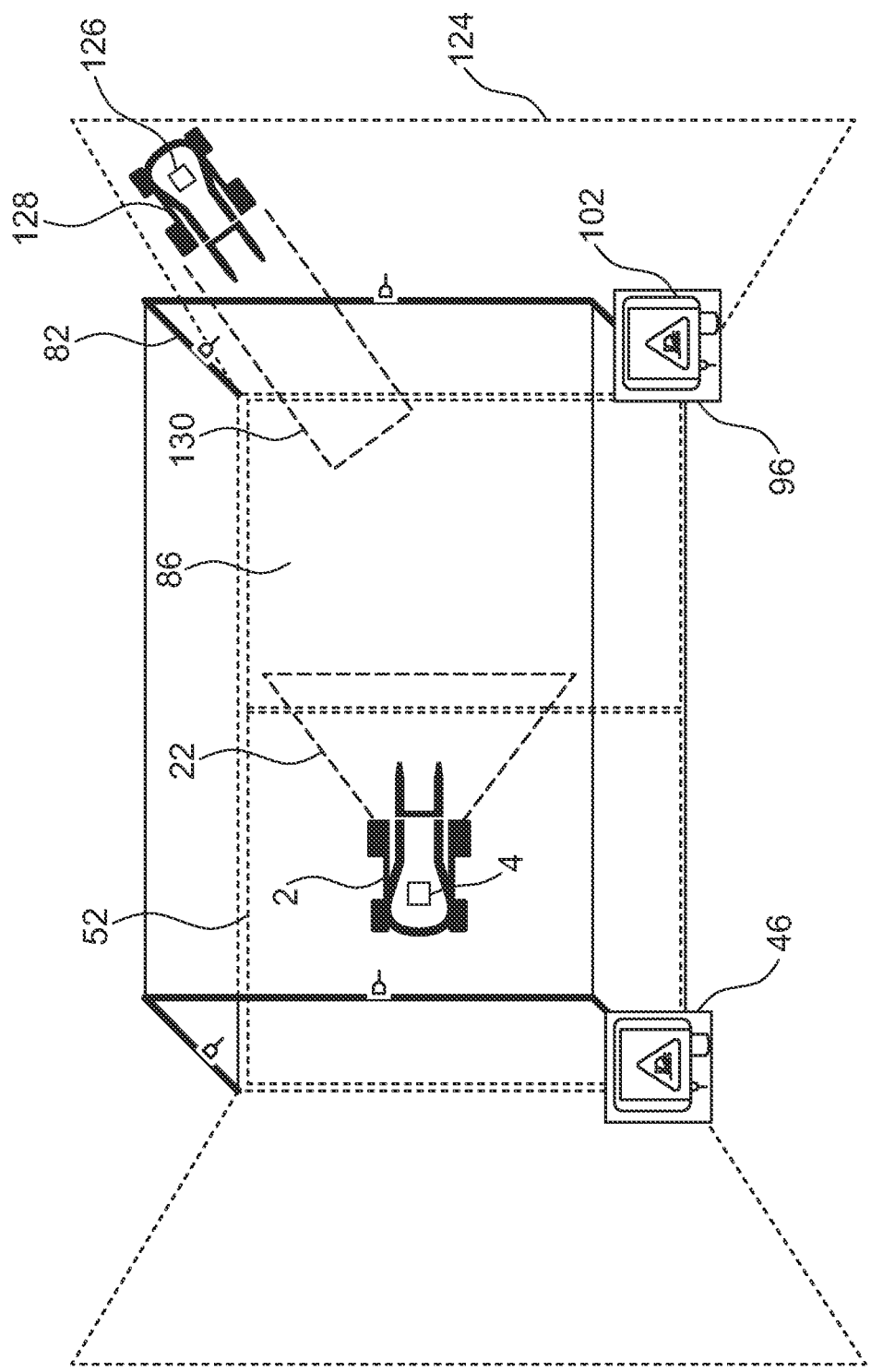
FIG. 10 is a schematic plan view of a lock safety system according to a fifth embodiment, which further comprises a second vehicle module.

FIG. 10 shows a fifth embodiment of a lock safety system 114 which is implemented analogously to the lock safety system 114 shown in FIG. 9 and further comprises a second vehicle module 126. The second vehicle module 126 is mounted on a second vehicle 128 and defines a fifth vehicle warning zone 130 representing a sub-region of a fourth three-dimensional electromagnetic field (not shown in FIG. 10). It should be understood that the second vehicle module 126 can be implemented analogously to the first vehicle module 4. The fifth vehicle warning zone 130 extends from the vehicle 128 in a rectangular projection to the front. The second gate processing unit 96 determines that the second vehicle module 126 is present in the fourth gate warning zone 124 and sends the configuration of the fourth gate warning zone 124 to the first gate module 40. In an analogous manner, the first gate processing unit 46 determines that the first vehicle module 4 is present within the first gate warning zone 52 and sends the configuration of the first warning zone 52 to the second gate module 96. The second gate processing unit 102 determines, using the configuration of the first gate warning zone 52, that the first vehicle module 4 is present within the lock 80. In this embodiment, the second gate module 96 is adapted to send a brake signal SB to the first vehicle module 4 and the second vehicle module 126. The second gate module 96 here sends the brake signal only to the second vehicle module 126, so that the second vehicle 128 is braked to a stop. The first vehicle module 4 and the second vehicle module 126 send a configuration of vehicle warning zones thereof 22, 130 to the first gate module 40 and the second gate module 96 so that these determine the travel directions of the vehicles 2, 128 relative to the first gate 5 or second gate 82. The second gate module 96 preferably only sends the brake signal to the second vehicle module 126 when it is determined that both the first vehicle 2 and the second vehicle 128 are moving towards the second gate 82. The brake signal is preferably only sent to the vehicle module that is disposed outside of the lock 80.

Figure 11A:
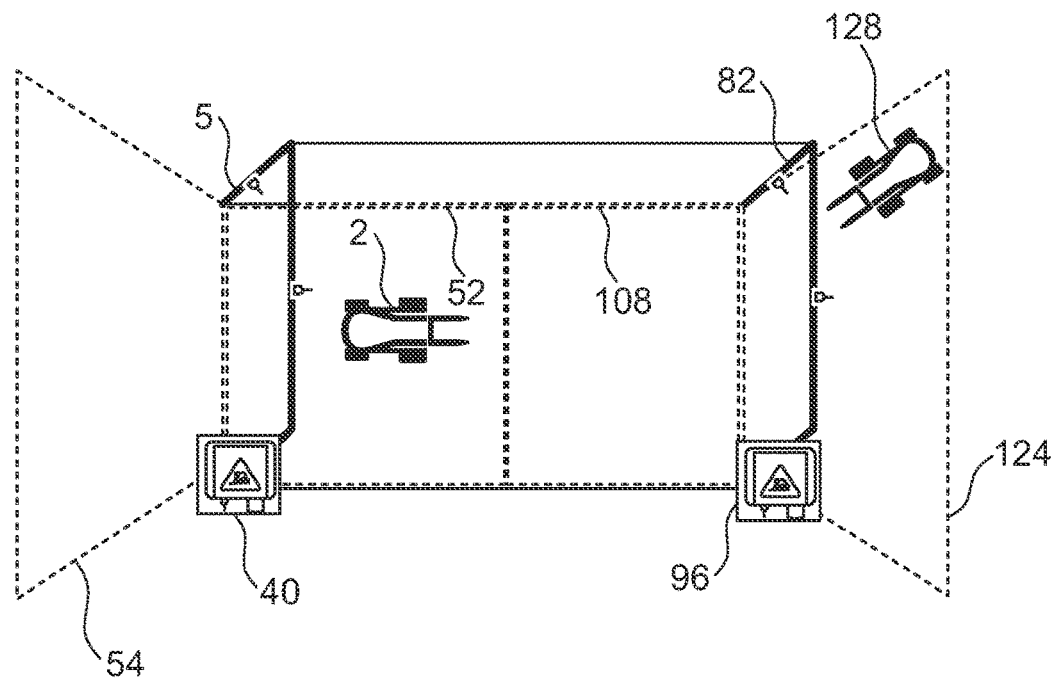
FIGS. 11A through 11D schematically illustrate the interaction of two vehicles with a lock and a lock safety system according to the fifth embodiment.
Figure 11B:
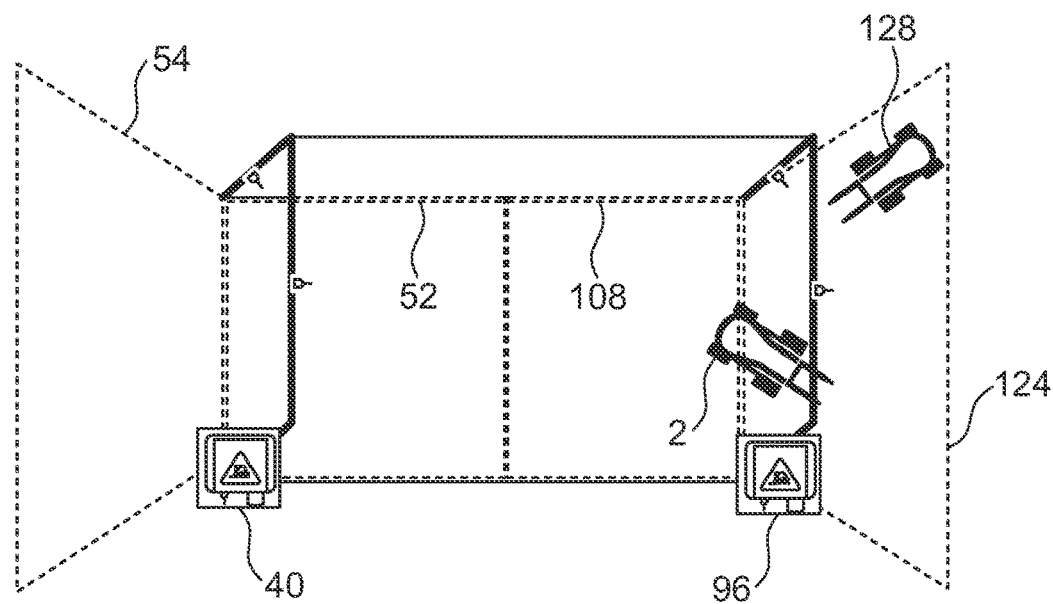
Figure 11C:
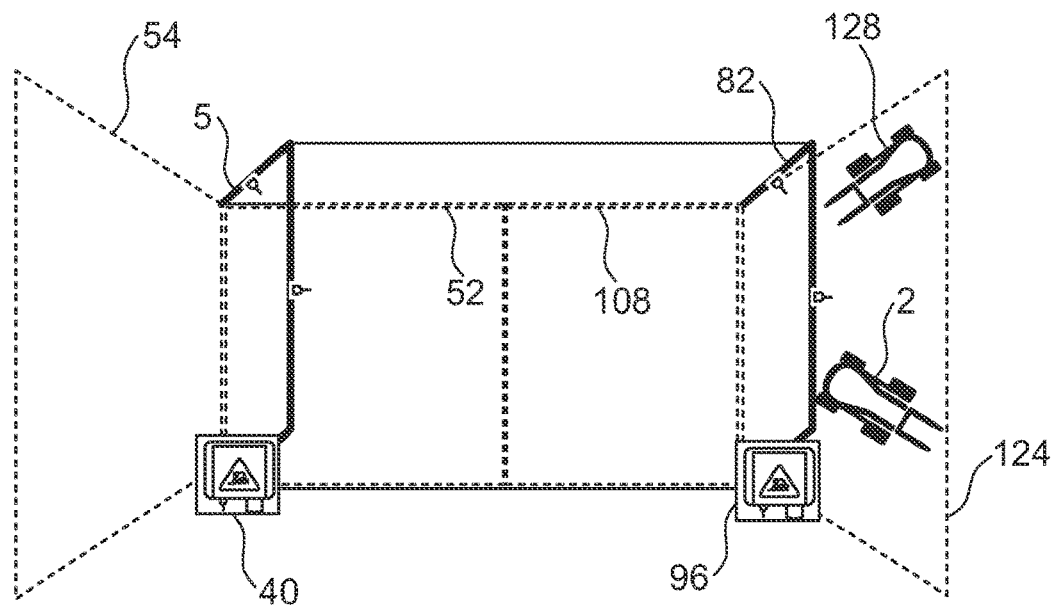

In this embodiment, the second vehicle 2 can drive through the lock 80 and exit through the second gate 82. The second vehicle 128 can then drive into the interior space 86 of the lock. FIGS. 11A to 11D illustrate this process, wherein the vehicle warning zones 22, 130 are not shown. In the state shown in FIG. 11A, the first vehicle 2 is disposed in the first gate warning zone 52 and the second vehicle 128 is disposed in the fourth gate warning zone 124. Since the second gate module 96 sends a brake signal SB to the second vehicle module 126 (not shown in FIG. 11), the second vehicle 128 is braked to a stop. The first gate module 40 determines, using the configuration of the first vehicle warning zone 22, that the first vehicle 2 is moving away from the first gate 5 and provides a closing signal STS at the first gate interface 56 so that the first gate 5 is closed. The second gate module 96 determines, using the configuration of the first vehicle warning zone 22, that the first vehicle 2 is moving towards the second gate 82 and that the first gate 5 is closed. The second gate module 96 then provides a second opening signal SO2 at the second gate interface 112, so that the second gate 82 is opened. In this embodiment, the second gate module 96 is adapted to detect whether a vehicle module 4, 126 matched to the gate module has completely passed from the third gate warning zone 108 into the fourth gate warning zone 124. In FIG. 11B, the first vehicle 2 is disposed both in the third gate warning zone 108 and in the fourth gate warning zone 124. In order to avoid collisions between a first or second vehicle 2, 128 and a first or second gate 5, 82, it can be provided that the first and/or second gate module 40, 96 only provide a closing signal STS when it is determined that a vehicle 2, 128 has completely passed from a first gate warning zone 52 into a second gate warning zone 54 or from a third gate warning zone 108 into a fourth gate warning zone 124. The second gate module 96 here only provides the closing signal STS when the first vehicle 2 has completely driven through the second gate 82 (FIG. 11C) or has completely passed from the third gate warning zone 108 into the fourth gate warning zone 124. A separation between adjacent gate warning zones is preferably disposed in a closing region of the gate.

Figure 11D:
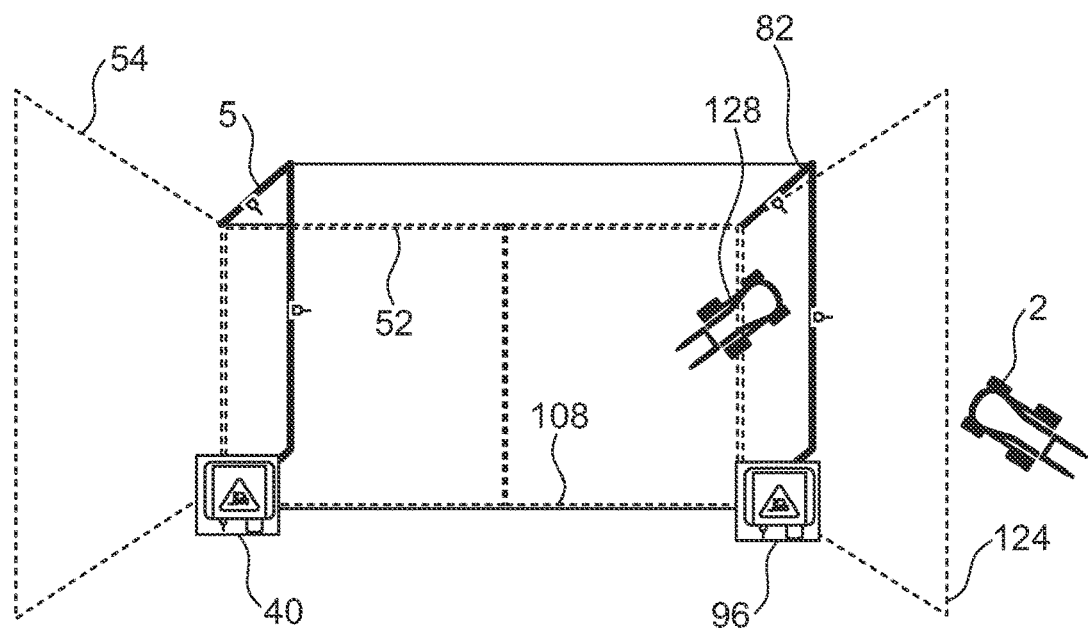

However, it can also be provided that the second gate module 96 does not provide the closing signal STS, since, using the fifth vehicle warning zone (not shown in FIG. 11), said second gate module determines that a direction of travel of the second vehicle 128 is aligned with the second gate 82. When the first vehicle 2 has left the fourth gate warning zone 124, the second gate module 96 stops sending the brake signal SB to the second vehicle module 126, so that the second vehicle 128 can enter the interior space 86 of the lock 80 through the second gate 82 (FIG. 11D). However, it can also be provided that the second gate module 96 sends the brake signal SB only once and the second vehicle 128 is braked until the gate module 96 sends an acceleration signal SA to the second vehicle module 126.

Figure 12:
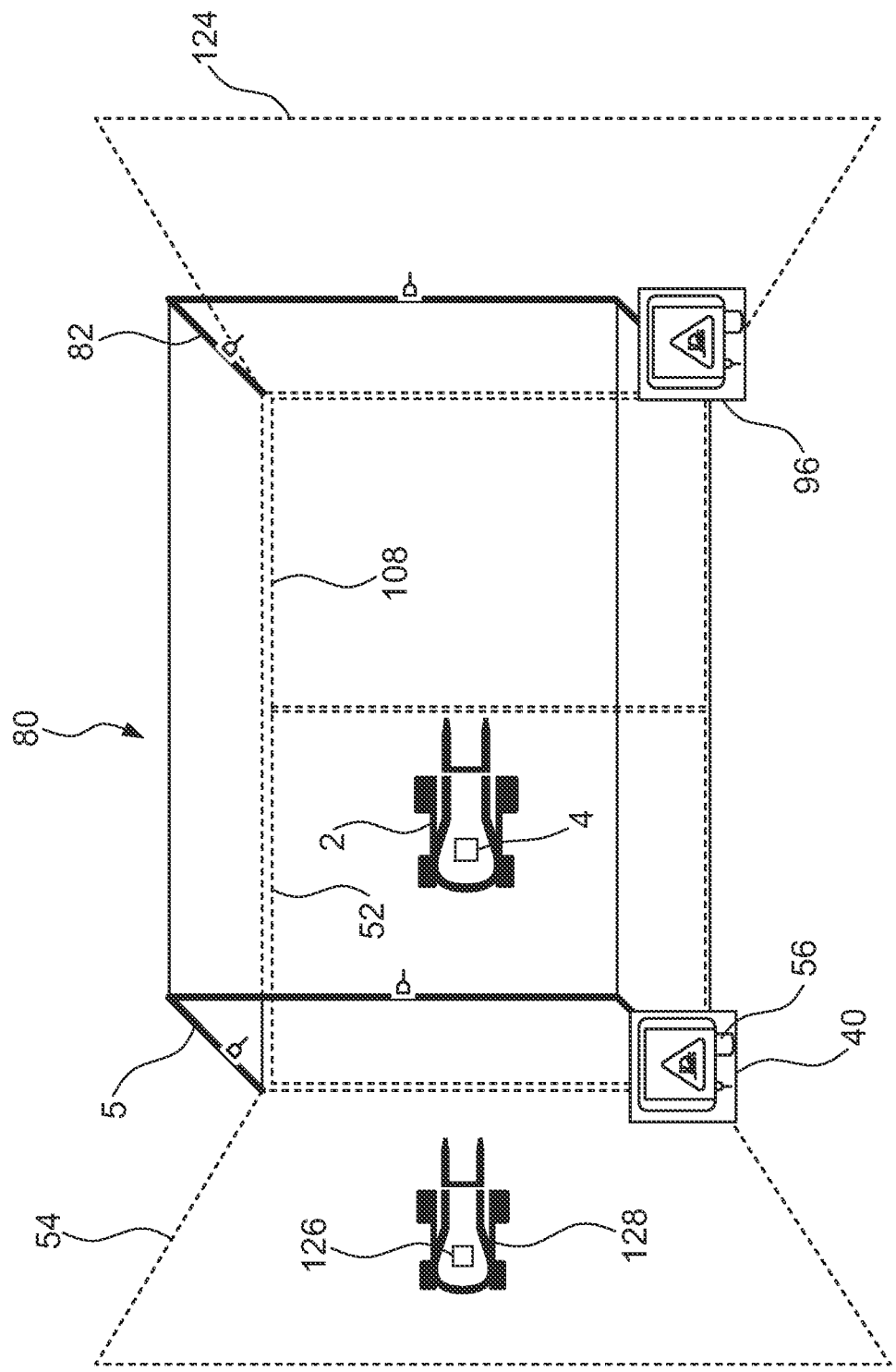
FIG. 12 is a schematic plan view of a variant of the lock safety system according to the fifth embodiment.

FIG. 12 shows a variant of the fifth embodiment of the lock safety system 118, wherein the first vehicle 2 is disposed in the first gate warning zone 52. The second vehicle 128 is disposed in the second gate warning zone 54 and drives towards the first gate 5, which, like the second gate 82, is closed. The first vehicle module 4 and the second vehicle module 126 send configurations of the first vehicle warning zone 22 and the fifth vehicle warning zone 130 to the first gate module 40. The first gate module 40 determines, using the first vehicle warning zone 22, that the first vehicle 2 is moving away from the first gate 5. Furthermore, the first gate module 40 determines, using the fifth vehicle warning zone 130, that the second vehicle 128 is moving towards the first gate 5. In this variant, the first gate module 40 provides a first opening signal SO at the first gate interface 56, since the first vehicle 2 and the second vehicle 128 are moving in different directions relative to the first gate 5 and thus the risk of a collision between the first vehicle 2 and the second vehicle 128 is low. However, it can also be preferred that the first gate 5 remains closed until the first vehicle 2 has left the lock 80 through the second gate 82.

Figure 13:
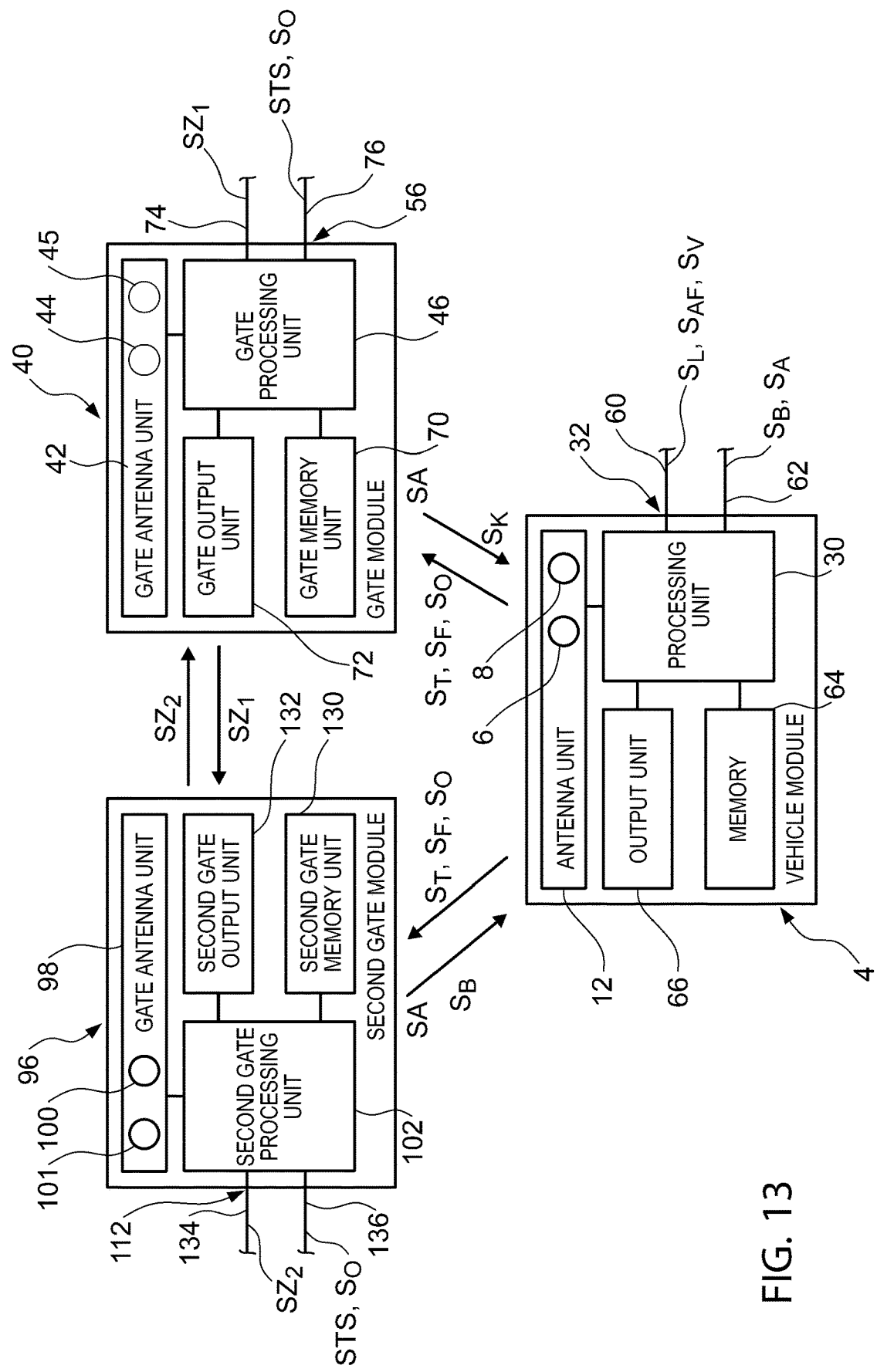
FIG. 13 is a schematic block diagram showing the structure of the first gate module, of the wide gate module and of the vehicle module of a lock safety system.

FIG. 13 schematically shows a vehicle module 4, a first gate module 40 and a second gate module 96. As already described above, the vehicle module 4 comprises an antenna unit 12, having a first vehicle antenna 6 and a second vehicle antenna 8 shown here. The processing unit 30 is connected to the antenna unit 12 and further comprises a vehicle interface 32. In this embodiment, the vehicle interface 32 is shown with a first line 60 and a second line 62, wherein the first line 60 is implemented to receive signals such as a steering angle signal SL, an acceleration signal of the vehicle SA and a speed signal of the vehicle SV. The second line 62 is provided for outputting signals from the vehicle module 4 to the vehicle 2, such as the brake signal SB and the acceleration signal SA. In addition to these units, the vehicle module 4 further comprises a memory 64 in which, for example, configurations for the first and second vehicle warning zones 22, 24, 26, 28 can be stored. Finally, the vehicle module 4 comprises an output unit 66 which can output optical and/or acoustic signals, for example, for warning a driver of the vehicle 2.

The gate module 40 comprises the gate antenna unit 42, the first gate processing unit 46, a gate memory unit 70 and a gate output unit 72. The gate interface 56 in turn comprises a first line 74 and a second line 76, wherein the first line 74 is implemented to receive signals from a gate controller, such as particularly a first state signal SZ1 of the first gate 5. The second line 76 is provided for outputting signals to the gate controller of the first gate 5, such as an opening signal SO and/or a closing signal STS.

In an analogous manner, the second gate module 96 comprises the second gate antenna unit 98, a second gate processing unit 102, a second gate memory unit 130 and a second gate output unit 132. The second gate antenna unit 98 here comprises a fourth gate antenna 100 and a fifth gate antenna 101. The second gate interface 112 in turn comprises a first line 134 and a second line 136, wherein the first line 134 is adapted to receive signals from a gate controller, such as particularly a second state signal SZ2 of the second gate 82. The second line 136 is provided for outputting signals to the gate controller of the second gate 82, such as a second opening signal SO2 and/or a closing signal STS.

The modules of the lock safety system, here the vehicle module 4, the first gate module 40 and the second gate module 96, communicate with each other by radio. For example, the vehicle module 4 can send the signals ST, SO, SF to the first gate module 40 and/or second gate module 96 by the antenna unit 12 or a further transmitting/receiving unit, and the first gate module 40 and/or the second gate module 96 can send the signals SB, SA to the vehicle module 4 in the same way. Furthermore, the first gate module 40 and the second gate module 96 also communicate with each other. For example, the first gate module 40 can send the open state and/or the first state signal SZ1 of the first gate 5 to the second gate module 96.

The embodiments described above are only descriptions of preferred embodiments of the present invention, and are not intended to limit the scope of the present invention. Various variations and modifications can be made to the technical solution of the present invention by those of ordinary skill in the art, without departing from the design and spirit of the present invention. The variations and modifications should all fall within the claimed scope defined by the claims of the present invention.

What is claimed is:

1. A gate safety system for preventing collisions between a vehicle and a gate, having:
a gate module, comprising:
a gate antenna unit, having at least one first gate antenna implemented for mounting in a predetermined spatial relationship to a gate frame of the gate, and for generating a first three-dimensional electromagnetic field,
a gate processing unit connected to the gate antenna unit and adapted for defining a first gate warning zone for the gate, the first gate warning zone representing a sub-region of the first electromagnetic field, the gate processing unit being adapted, by the gate antenna unit, for determining whether a vehicle module matched to the gate antenna unit is present within the first gate warning zone, wherein the gate processing unit is configured to send a geometry configuration of the first gate warning zone to the vehicle module, such that the vehicle module processes the geometry configuration of the first gate warning zone to determine whether the vehicle module is present within the first gate warning zone, and
a gate interface for connecting the gate module to a controller of the gate;
wherein the gate safety system further comprises the vehicle module, the vehicle module comprising:
a vehicle antenna unit, having at least one first vehicle antenna implemented for mounting in a predetermined spatial relationship on the vehicle, and for generating a second three-dimensional electromagnetic field, and
a vehicle processing unit connected to the vehicle antenna unit and adapted for defining at least one first vehicle warning zone for the vehicle, representing a sub-region of the second electromagnetic field, wherein the vehicle processing unit, in response to receiving the geometry configuration of the first gate warning zone, is adapted, by the vehicle antenna unit, for determining whether the gate module matched to the vehicle antenna unit is present within the first vehicle warning zone, wherein the vehicle processing unit is further adapted for determining a trajectory signal that identifies a probable movement path of the first vehicle, and wherein the vehicle processing unit, in response to determining that the gate module is present within the first vehicle warning zone, is set up for sending a configuration of the first vehicle warning zone and the trajectory signal to the gate module,
wherein the gate processing unit is further set up, based on the received configuration of the first vehicle warning zone and the trajectory signal, for determining a direction of travel of the first vehicle relative to the gate,
wherein the gate processing unit is further set up to determine, based on the direction of travel of the first vehicle, whether the first vehicle is moving toward the gate, moving toward the region to the right or left of endpoints of the gate, moving generally parallel to the gate, or moving away from the gate, and
wherein the gate processing unit is further set up to provide an opening signal to the gate interface based on the first vehicle moving toward the region to the right or to the left of the endpoints of the gate.

2. The gate safety system according to claim 1, wherein the first gate warning zone is associated with a first gate activity set having at least one first gate follow-on operation and a second gate activity set having at least one second gate follow-on operation, and
a first vehicle activity set having at least one first vehicle follow-on operation and a second vehicle activity set having at least one second vehicle follow-on operation are associated with the first vehicle warning zone.

3. The gate safety system according to claim 2, wherein the gate processing unit is adapted for receiving a state signal by the gate interface and by the received state signal, for determining whether the gate is in an open or closed state.

4. The gate safety system according to claim 3, wherein the gate processing unit is implemented for selecting the first or second gate activity set as a function of the determined state.

5. The gate safety system according to claim 3, wherein the gate processing unit is set up for sending a brake signal to the vehicle module for braking the vehicle.

6. The gate safety system according to claim 3, wherein the gate processing unit is set up for providing the opening signal for opening the gate at the gate interface.

7. The gate safety system according to claim 1, wherein the gate processing unit is adapted for defining a second gate warning zone for the gate representing a sub-region of the first electromagnetic field, wherein the gate processing unit is adapted for determining, by the gate antenna unit, whether the vehicle module is present within the second gate warning zone.

8. The gate safety system according to claim 7, wherein the second gate warning zone is disposed adjacent to the first gate warning zone on an opposite side of the gate or partially or completely overlapping the first gate warning zone.

9. The gate safety system according to claim 1, wherein the first gate warning zone is circular, oval, rectangular, or trapezoidal in a vertical projection.

10. The gate safety system according to claim 1, wherein the gate processing unit is set up for detecting a second vehicle module in the first gate warning zone and for sending a brake signal in response to both vehicle modules for braking the vehicles.

11. The gate safety system according to claim 1, wherein the gate antenna unit comprises a second gate antenna, and wherein the first and second gate antennas are provided for mounting at a distance from each other in a direction of a width of the gate and jointly define the first gate warning zone.

12. The gate safety system according to claim 1, wherein the vehicle module comprises a vehicle interface for connecting the vehicle module to a controller of the vehicle.

13. The gate safety system according to claim 1, wherein the vehicle processing unit is set up for generating the first vehicle warning zone so that said first vehicle warning zone extends forward from a vehicle front at least when driving forward.

14. The gate safety system of claim 13, wherein the first vehicle warning zone is trapezoidal in a vertical projection and widens forward in a vehicle width direction.

15. The gate safety system according to claim 13, wherein the vehicle processing unit is set up for modifying the first vehicle warning zone as a function of at least one speed of the vehicle.

16. The gate safety system according to claim 1, wherein the vehicle processing unit is set up for generating the first vehicle warning zone so that said first vehicle warning zone extends from the rear of a vehicle when driving backwards.

17. The gate safety system according to claim 1, wherein the vehicle processing unit is set up for sending the opening signal to the gate processing unit for opening the gate when the vehicle processing unit detects a gate module in the first vehicle warning zone.

18. The gate safety system according to claim 1, wherein the gate module is set up for providing the opening signal for opening the gate when it is determined that the vehicle module is moving towards the gate.

19. The gate safety system according to claim 1, wherein the vehicle antenna unit comprises a second vehicle antenna and a third vehicle antenna implemented for mounting spaced apart from each other and in a predetermined spatial relationship to each other at predetermined positions on the vehicle and each generate an electromagnetic field to jointly define the first vehicle warning zone.

20. The gate safety system according to claim 1, wherein the gate processing unit, when determining whether to open the gate, refrains from providing the opening signal to the gate interface based on determining that the vehicle is moving parallel to the gate.

\* \* \* \* \*